(12) United States Patent
Heo et al.

(10) Patent No.: US 10,631,190 B2
(45) Date of Patent: *Apr. 21, 2020

(54) DISCONTINUOUS RECEPTION (DRX) ENHANCEMENTS IN LTE SYSTEMS

(71) Applicant: Intel Corporation, Santa Clara, CA (US)

(72) Inventors: Youn Hyoung Heo, Seoul (KR); Yujian Zhang, Beijing (CN); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,810

(22) Filed: Jun. 22, 2018

(65) Prior Publication Data

US 2018/0302820 A1    Oct. 18, 2018

Related U.S. Application Data

(63) Continuation of application No. 15/244,676, filed on Aug. 23, 2016, now Pat. No. 10,045,245, which is a (Continued)

(51) Int. Cl.
*H04W 28/02* (2009.01)
*H04W 4/70* (2018.01)
(Continued)

(52) U.S. Cl.
CPC ...... *H04W 28/0221* (2013.01); *H04B 17/318* (2015.01); *H04J 3/1694* (2013.01);
(Continued)

(58) Field of Classification Search
CPC ... H04W 28/0221; H04W 4/70; H04W 76/12; H04W 76/28
See application file for complete search history.

(56) References Cited

U.S. PATENT DOCUMENTS 7,461,253 B2   12/2008   Braskich et al.
8,976,954 B1   3/2015    Williams et al.
(Continued)

FOREIGN PATENT DOCUMENTS

BE   1020890 A5   7/2014
CN   101860946 A   10/2010
(Continued)

OTHER PUBLICATIONS

U.S. Appl. No. 14/125,749, filed Dec. 12, 2013, Discontinuous Reception (DRX) Enhancements in LTE Systems, U.S. Pat. No. 9,332,456.
(Continued)

*Primary Examiner* — Albert T Chou
(74) *Attorney, Agent, or Firm* — Kowert, Hood, Munyon, Rankin & Goetzel, P.C.

(57) ABSTRACT

Embodiments of a system and method for providing DRX enhancements in LTE systems are generally described herein. In some embodiments, a system control module is provided for controlling communications via a communications interface. A processor is coupled to the system control module and is arranged to implement an inactivity timer and an on-duration timer for determining an active time for monitoring subframes on the physical downlink control channel for control signals, the processor further monitoring subframes after the active time.

20 Claims, 10 Drawing Sheets

Related U.S. Application Data continuation of application No. 14/757,660, filed on Dec. 23, 2015, now Pat. No. 9,949,164, which is a continuation of application No. 14/125,749, filed as application No. PCT/US2013/062210 on Sep. 27, 2013, now Pat. No. 9,332,456.

(60) Provisional application No. 61/707,784, filed on Sep. 28, 2012.

(51) Int. Cl.

| | | |
|---|---|---|
| *H04W 76/30* | (2018.01) | |
| *H04W 76/28* | (2018.01) | |
| *H04W 72/04* | (2009.01) | |
| *H04W 40/00* | (2009.01) | |
| *H04W 40/24* | (2009.01) | |
| *H04W 52/02* | (2009.01) | |
| *H04W 52/04* | (2009.01) | |
| *H04B 17/318* | (2015.01) | |
| *H04W 76/12* | (2018.01) | |
| *H04W 76/15* | (2018.01) | |
| *H04W 76/23* | (2018.01) | |
| *H04W 76/27* | (2018.01) | |
| *H04J 3/16* | (2006.01) | |
| *H04J 11/00* | (2006.01) | |
| *H04L 1/18* | (2006.01) | |
| *H04L 5/00* | (2006.01) | |
| *H04L 5/14* | (2006.01) | |
| *H04L 12/24* | (2006.01) | |
| *H04L 29/06* | (2006.01) | |
| *H04L 29/08* | (2006.01) | |
| *H04W 8/08* | (2009.01) | |
| *H04W 24/02* | (2009.01) | |
| *H04W 24/08* | (2009.01) | |
| *H04W 24/10* | (2009.01) | |
| *H04W 28/08* | (2009.01) | |
| *H04W 28/16* | (2009.01) | |
| *H04W 36/00* | (2009.01) | |
| *H04W 36/22* | (2009.01) | |
| *H04W 48/16* | (2009.01) | |
| *H04W 48/20* | (2009.01) | |
| *H04W 52/14* | (2009.01) | |
| *H04W 72/02* | (2009.01) | |
| *H04W 72/08* | (2009.01) | |
| *H04W 72/12* | (2009.01) | |
| *H04W 74/00* | (2009.01) | |
| *H04W 88/02* | (2009.01) | |
| *H04W 76/16* | (2018.01) | |
| *H04L 12/26* | (2006.01) | |
| *H04W 36/14* | (2009.01) | |
| *H04W 88/06* | (2009.01) | |
| *H04W 72/00* | (2009.01) | |
| *H04W 80/10* | (2009.01) | |
| *H04W 84/12* | (2009.01) | |
| *H04W 88/08* | (2009.01) | |
| *H04W 88/18* | (2009.01) | |
| *H04W 84/04* | (2009.01) | |
| *H04W 88/12* | (2009.01) | |
| *H04W 88/14* | (2009.01) | |
| *H04W 88/16* | (2009.01) | |

(52) U.S. Cl.
CPC ............ *H04J 11/00* (2013.01); *H04J 11/0086* (2013.01); *H04L 1/1812* (2013.01); *H04L 1/1861* (2013.01); *H04L 1/1864* (2013.01); *H04L 1/1893* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/069* (2013.01); *H04L 41/5032* (2013.01); *H04L 43/16* (2013.01); *H04L 65/60* (2013.01); *H04L 65/602* (2013.01); *H04L 67/10* (2013.01); *H04W 4/70* (2018.02); *H04W 8/08* (2013.01); *H04W 24/02* (2013.01); *H04W 24/08* (2013.01); *H04W 24/10* (2013.01); *H04W 28/0205* (2013.01); *H04W 28/0215* (2013.01); *H04W 28/0252* (2013.01); *H04W 28/0268* (2013.01); *H04W 28/08* (2013.01); *H04W 28/16* (2013.01); *H04W 36/0061* (2013.01); *H04W 36/0066* (2013.01); *H04W 36/0083* (2013.01); *H04W 36/0088* (2013.01); *H04W 36/14* (2013.01); *H04W 36/22* (2013.01); *H04W 40/005* (2013.01); *H04W 40/246* (2013.01); *H04W 48/16* (2013.01); *H04W 48/20* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/0453* (2013.01); *H04W 72/0486* (2013.01); *H04W 72/082* (2013.01); *H04W 72/1284* (2013.01); *H04W 74/002* (2013.01); *H04W 74/004* (2013.01); *H04W 76/12* (2018.02); *H04W 76/15* (2018.02); *H04W 76/16* (2018.02); *H04W 76/23* (2018.02); *H04W 76/27* (2018.02); *H04W 76/28* (2018.02); *H04W 76/30* (2018.02); *H04W 88/02* (2013.01); *H04L 5/001* (2013.01); *H04W 72/005* (2013.01); *H04W 80/10* (2013.01); *H04W 84/042* (2013.01); *H04W 84/12* (2013.01); *H04W 88/06* (2013.01); *H04W 88/08* (2013.01); *H04W 88/12* (2013.01); *H04W 88/14* (2013.01); *H04W 88/16* (2013.01); *H04W 88/18* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/21* (2018.01); *Y02D 70/22* (2018.01); *Y02D 70/23* (2018.01); *Y02D 70/24* (2018.01); *Y02D 70/25* (2018.01); *Y02D 70/42* (2018.01)

(56) References Cited

U.S. PATENT DOCUMENTS

| | | | |
|---|---|---|---|
| 8,989,114 B2 | 3/2015 | Kim et al. | |
| 9,288,756 B2 | 3/2016 | Stojanovski et al. | |
| 9,332,456 B2 * | 5/2016 | Heo .................. | H04W 4/70 |
| 9,894,705 B2 | 2/2018 | Virtej et al. | |
| 9,949,164 B2 * | 4/2018 | Heo .................. | H04W 4/70 |
| 10,045,245 B2 * | 8/2018 | Heo .................. | H04W 4/70 |
| 2002/0184373 A1 | 12/2002 | Maes | |
| 2003/0056093 A1 | 3/2003 | Huitema et al. | |
| 2004/0039906 A1 | 2/2004 | Oka et al. | |
| 2006/0031378 A1 | 2/2006 | Vallapureddy et al. | |
| 2007/0003062 A1 | 1/2007 | Mizikovsky et al. | |
| 2007/0081494 A1 | 4/2007 | Petrescu et al. | |
| 2007/0091889 A1 | 4/2007 | Xiao et al. | |

(56) References Cited

U.S. PATENT DOCUMENTS

| | | |
|---|---|---|
| 2007/0109989 A1 | 5/2007 | Nakagawa et al. |
| 2008/0005568 A1 | 1/2008 | Watson et al. |
| 2008/0183339 A1 | 7/2008 | Vaswani et al. |
| 2009/0181670 A1 | 7/2009 | Tseng |
| 2009/0264124 A1 | 10/2009 | Rofougaran |
| 2009/0265542 A1 | 10/2009 | Khetawat et al. |
| 2010/0110896 A1 | 5/2010 | Tseng et al. |
| 2010/0110897 A1 | 5/2010 | Chun et al. |
| 2010/0118815 A1 | 5/2010 | Kim et al. |
| 2010/0272018 A1 | 10/2010 | Furueda et al. |
| 2010/0285810 A1 | 11/2010 | Ko et al. |
| 2010/0303039 A1 | 12/2010 | Zhang et al. |
| 2010/0317343 A1 | 12/2010 | Krishnamurthy et al. |
| 2010/0322173 A1 | 12/2010 | Marinier et al. |
| 2011/0002281 A1 | 1/2011 | Terry et al. |
| 2011/0026504 A1 | 2/2011 | Feinberg |
| 2011/0075675 A1 | 3/2011 | Koodli et al. |
| 2011/0078438 A1 | 3/2011 | Tie et al. |
| 2011/0086652 A1 | 4/2011 | So et al. |
| 2011/0116415 A1 | 5/2011 | Naito et al. |
| 2011/0143796 A1 | 6/2011 | Lee et al. |
| 2011/0170427 A1 | 7/2011 | Koivisto et al. |
| 2011/0194505 A1 | 8/2011 | Faccin et al. |
| 2011/0199910 A1 | 8/2011 | Oh et al. |
| 2011/0201275 A1 | 8/2011 | Jabara et al. |
| 2011/0222466 A1 | 9/2011 | Pance et al. |
| 2011/0269449 A1 | 11/2011 | Kazmi et al. |
| 2011/0270984 A1 | 11/2011 | Park |
| 2011/0271334 A1 | 11/2011 | Yang et al. |
| 2011/0292912 A1 | 12/2011 | Zembutsu et al. |
| 2011/0305223 A1 | 12/2011 | Koo et al. |
| 2012/0002537 A1 | 1/2012 | Bao et al. |
| 2012/0020230 A1 | 1/2012 | Chen et al. |
| 2012/0044808 A1 | 2/2012 | Song |
| 2012/0064932 A1 | 3/2012 | Lim et al. |
| 2012/0069817 A1 | 3/2012 | Ling et al. |
| 2012/0113816 A1 | 5/2012 | Bhattad et al. |
| 2012/0120828 A1 | 5/2012 | Anderson et al. |
| 2012/0144226 A1 | 6/2012 | Yang et al. |
| 2012/0155643 A1 | 6/2012 | Hassan et al. |
| 2012/0165034 A1 | 6/2012 | Boudreau et al. |
| 2012/0176884 A1 | 7/2012 | Zhang et al. |
| 2012/0184275 A1 | 7/2012 | Okabe et al. |
| 2012/0188907 A1 | 7/2012 | Dayal et al. |
| 2012/0213261 A1 | 8/2012 | Sayana et al. |
| 2012/0220327 A1 | 8/2012 | Lee et al. |
| 2012/0257522 A1 | 10/2012 | Adachi et al. |
| 2012/0276913 A1 | 11/2012 | Lim et al. |
| 2012/0281643 A1 | 11/2012 | Sun et al. |
| 2012/0282966 A1 | 11/2012 | Koo et al. |
| 2012/0314689 A1 | 12/2012 | Wang et al. |
| 2013/0024684 A1 | 1/2013 | Chunduri et al. |
| 2013/0039287 A1 | 2/2013 | Rayavarapu et al. |
| 2013/0044708 A1 | 2/2013 | Kim et al. |
| 2013/0100871 A1 | 4/2013 | Vujcic |
| 2013/0121220 A1 | 5/2013 | Virtej et al. |
| 2013/0142166 A1 | 6/2013 | Bogineni et al. |
| 2013/0157661 A1 | 6/2013 | Bhaskaran et al. |
| 2013/0172036 A1 | 7/2013 | Miklos et al. |
| 2013/0188558 A1 | 7/2013 | Nam et al. |
| 2013/0194931 A1 | 8/2013 | Lee et al. |
| 2013/0196675 A1 | 8/2013 | Xiao et al. |
| 2013/0208604 A1 | 8/2013 | Lee et al. |
| 2013/0242897 A1 | 9/2013 | Meylan et al. |
| 2013/0244676 A1 | 9/2013 | Koivisto et al. |
| 2013/0279437 A1 | 10/2013 | Ng et al. |
| 2013/0301420 A1 | 11/2013 | Zhang et al. |
| 2013/0322235 A1 | 12/2013 | Khoryaev et al. |
| 2013/0322352 A1 | 12/2013 | Han et al. |
| 2014/0003375 A1 | 1/2014 | Nam et al. |
| 2014/0022988 A1 | 1/2014 | Davydov et al. |
| 2014/0036796 A1 | 2/2014 | Etemad et al. |
| 2014/0036810 A1 | 2/2014 | Harrison et al. |
| 2014/0092828 A1 | 4/2014 | Sirotkin |
| 2014/0092833 A1 | 4/2014 | Vannithamby et al. |
| 2014/0092878 A1 | 4/2014 | Davydov et al. |
| 2014/0094119 A1 | 4/2014 | Stojanovski et al. |
| 2014/0105011 A1 | 4/2014 | Chandramouli et al. |
| 2014/0213259 A1 | 7/2014 | Teyeb et al. |
| 2014/0254530 A1 | 9/2014 | Kim et al. |
| 2014/0293973 A1 | 10/2014 | Lin et al. |
| 2014/0301345 A1 | 10/2014 | Kim et al. |
| 2014/0357273 A1 | 12/2014 | Teng et al. |
| 2015/0109982 A1 | 4/2015 | Futaki |
| 2015/0117286 A1 | 4/2015 | Kim et al. |
| 2015/0195822 A1 | 7/2015 | Han et al. |
| 2015/0207604 A1 | 7/2015 | Sun et al. |
| 2015/0215091 A1 | 7/2015 | Lee et al. |
| 2015/0223050 A1 | 8/2015 | Yiu et al. |
| 2015/0223284 A1 | 8/2015 | Jain et al. |
| 2015/0305083 A1 | 10/2015 | Heo et al. |
| 2016/0128127 A1 | 5/2016 | Heo et al. |
| 2016/0366722 A1 | 12/2016 | Heo et al. |
| 2018/0041960 A1 | 2/2018 | Futaki |

FOREIGN PATENT DOCUMENTS

| | | |
|---|---|---|
| CN | 102625421 A | 8/2012 |
| CN | 102638880 A | 8/2012 |
| CN | 103581880 A | 2/2014 |
| CN | 104737485 A | 6/2015 |
| CN | 104737619 A | 6/2015 |
| CN | 104813693 A | 7/2015 |
| CN | 104904303 A | 9/2015 |
| CN | 105103590 A | 11/2015 |
| EP | 2381709 A1 | 10/2011 |
| EP | 2485540 A1 | 8/2012 |
| EP | 2871896 A1 | 5/2015 |
| EP | 2875588 A | 5/2015 |
| EP | 2901574 A1 | 8/2015 |
| EP | 2901584 A | 8/2015 |
| EP | 2901603 A1 | 8/2015 |
| EP | 2901729 A1 | 8/2015 |
| EP | 2901740 A1 | 8/2015 |
| EP | 2901810 A1 | 8/2015 |
| EP | 2901811 A1 | 8/2015 |
| EP | 2918136 A1 | 9/2015 |
| ES | 2477040 A2 | 7/2014 |
| FI | 124643 B | 11/2014 |
| FR | 2993746 A1 | 1/2014 |
| GB | 2419067 A | 4/2006 |
| HK | 1217263 A1 | 12/2016 |
| JP | 2009171580 A | 7/2009 |
| JP | 2012507971 A | 3/2012 |
| JP | 2012100304 A | 5/2012 |
| JP | 2012104951 A | 5/2012 |
| JP | 2012520001 A | 8/2012 |
| JP | 2012175641 A | 9/2012 |
| JP | 2013533715 A | 8/2013 |
| JP | 2015525525 A | 9/2015 |
| JP | 2015532047 A | 11/2015 |
| JP | 2015534394 A | 11/2015 |
| JP | 5996805 B2 | 9/2016 |
| KR | 1020090083269 A | 8/2009 |
| KR | 1020100034675 A | 4/2010 |
| KR | 20100047449 A | 5/2010 |
| KR | 1020100047449 A | 5/2010 |
| KR | 1020110037420 A | 4/2011 |
| KR | 1020110048422 A | 5/2011 |
| KR | 1020110097623 A | 8/2011 |
| KR | 1020110111234 A | 10/2011 |
| KR | 1020120098899 A | 9/2012 |
| KR | 1020150040989 A | 4/2015 |
| KR | 1020150064016 A | 6/2015 |
| KR | 101828887 B1 | 2/2018 |
| TW | 201409980 A | 3/2014 |
| TW | 201611558 A | 3/2016 |
| WO | WO-2005008939 A2 | 1/2005 |
| WO | WO-2010101440 A2 | 9/2010 |
| WO | WO-2011055999 A2 | 5/2011 |
| WO | WO-2011100673 A1 | 8/2011 |
| WO | WO-2011106538 A1 | 9/2011 |
| WO | WO 2011108889 A2 | 9/2011 |
| WO | WO-2011116240 A1 | 9/2011 |

(56) References Cited

FOREIGN PATENT DOCUMENTS

| WO | WO-2011136321 A1 | 11/2011 |
|---|---|---|
| WO | WO-2012021018 A2 | 2/2012 |
| WO | WO-2012043524 A1 | 4/2012 |
| WO | WO-2012057407 A1 | 5/2012 |
| WO | WO-2012085637 A1 | 6/2012 |
| WO | WO-2012094151 A2 | 7/2012 |
| WO | WO-2012099319 A1 | 7/2012 |
| WO | WO-2012109542 A1 | 8/2012 |
| WO | WO-2013151404 A1 | 10/2013 |
| WO | WO-2014014576 A1 | 1/2014 |
| WO | WO-2014051951 A1 | 4/2014 |
| WO | WO-2014052175 A1 | 4/2014 |
| WO | WO-2014052303 A1 | 4/2014 |
| WO | WO-2014052730 A1 | 4/2014 |
| WO | WO-2014052774 A1 | 4/2014 |
| WO | WO-2014052850 A1 | 4/2014 |
| WO | WO-2014052877 A1 | 4/2014 |
| WO | WO-2014052905 A1 | 4/2014 |

OTHER PUBLICATIONS

U.S. Appl. No. 14/757,660, filed Dec. 23, 2015, Discontinuous Reception (DRX) Enhancements in LTE Systems, U.S. Pat. No. 9,949,164.
U.S. Appl. No. 15/244,676, filed Aug. 23, 2016, Discontinuous Reception (DRX) Enhancements in LTE Systems, U.S. Pat. No. 10,045,245.
U.S. Appl. No. 15/244,676, filed Aug. 23, 2016, Discontinuous Reception (DRX) Enhancements in LTE Systems.
"U.S. Appl. No. 13/706,098, Examiner Interview Summary dated Oct. 28, 2015", 3 pgs.
"U.S. Appl. No. 13/706,098, Final Office Action dated Feb. 16, 2016", 28 pgs.
"U.S. Appl. No. 13/706,098, Final Office Action dated Dec. 17, 2014", 24 pgs.
"U.S. Appl. No. 13/706,098, Non Final Office Action dated May 9, 2014", 21 pgs.
"U.S. Appl. No. 13/706,098, Non Final Office Action dated Jun. 4, 2015", 26 pgs.
"U.S. Appl. No. 13/706,098, Preliminary amendment filed Sep. 12, 2013", 8 pgs.
"U.S. Appl. No. 13/706,098, Response filed Apr. 15, 2016 to Final Office Action dated Feb. 16, 2016", 14 pgs.
"U.S. Appl. No. 13/706,098, Response filed Apr. 21, 2015 to Final Office Action dated Dec. 17, 2014", 15 pgs.
"U.S. Appl. No. 13/706,098, Response filed Sep. 9, 2014 to Non-Final Office Action dated May 9, 2014", 10 pgs.
"U.S. Appl. No. 13/706,098, Response filed Oct. 21, 2015 to Non Final Office Action dated Jun. 4, 2015", 14 pgs.
"U.S. Appl. No. 13/926,273, Advisory Action dated Apr. 26, 2016", 4 pgs.
"U.S. Appl. No. 13/926,273, Final Office Action dated Jan. 15, 2016", 28 pgs.
"U.S. Appl. No. 13/926,273, Non Final Office Action dated Apr. 30, 2015", 22 pgs.
"U.S. Appl. No. 13/926,273, Response filed Mar. 15, 2016 to Final Office Action dated Jan. 15, 2016", 11 pgs.
"U.S. Appl. No. 13/926,273, Response filed Sep. 30, 2015 to Non Final Office Action dated Apr. 30, 2015", 11 pgs.
"U.S. Appl. No. 13/930,669, Non Final Office Action dated Mar. 25, 2015", 11 pgs.
"U.S. Appl. No. 13/930,669, Notice of Allowance dated Oct. 13, 2015", 5 pgs.
"U.S. Appl. No. 13/930,669, Response filed Jun. 25, 2015 to Non Final Office Action dated Mar. 25, 2015", 12 pgs.
"U.S. Appl. No. 14/012,062, Final Office Action dated Feb. 2, 2016", 16 pgs.
"U.S. Appl. No. 14/012,062, Non Final Office Action dated Jul. 23, 2015", 15 pgs.
"U.S. Appl. No. 14/012,062, Response filed Oct. 23, 2015 to Non Final Office Action dated Jul. 23, 2015", 11 pgs.
"U.S. Appl. No. 14/027,401, Final Office Action dated Apr. 1, 2016", 33 pgs.
"U.S. Appl. No. 14/027,401, Non Final Office Action dated Aug. 26, 2015", 35 pgs.
"U.S. Appl. No. 14/027,401, Preliminary Amendment filed Dec. 26, 2014", 16 pgs.
"U.S. Appl. No. 14/027,401, Response filed Dec. 28, 2015 to Non Final Office Action dated Aug. 26, 2015", 18 pgs.
"U.S. Appl. No. 14/125,706, Non Final Office Action dated Sep. 30, 2015", 22 pgs.
"U.S. Appl. No. 14/125,706, Notice of Allowance dated Feb. 2, 2016", 10 pgs.
"U.S. Appl. No. 14/125,706, Preliminary Amendment filed Dec. 12, 2013", 14 pgs.
"U.S. Appl. No. 14/125,749, Corrected Notice of Allowance dated Feb. 9, 2016", 2 pgs.
"U.S. Appl. No. 14/125,749, Non Final Office Action dated Sep. 10, 2015", 10 pgs.
"U.S. Appl. No. 14/125,749, Notice of Allowance dated Dec. 24, 2015", 10 pgs.
"U.S. Appl. No. 14/125,749, Preliminary Amendment filed Dec. 12, 2013", 8 pgs.
"U.S. Appl. No. 14/125,749, Response filed Dec. 9, 2015 to Non Final Office Action dated Sep. 10, 2015", 10 pgs.
"U.S. Appl. No. 14/125,749, Supplemental Preliminary Amendment filed Dec. 16, 2015", 8 pgs.
"U.S. Appl. No. 14/126,252, Non Final Office Action dated Dec. 21, 2015", 33 pgs.
"U.S. Appl. No. 14/126,252, Preliminary Amendment dated Dec. 13, 2013", 5 pgs.
"U.S. Appl. No. 14/126,252, Response filed Mar. 21, 2016 to Non Final Office Action dated Dec. 21, 2015", 13 pgs.
"U.S. Appl. No. 14/127,830, Examiner Interview Summary dated Mar. 24, 2016", 3 pgs.
"U.S. Appl. No. 14/127,830, Non Final Office Action dated Jan. 20, 2016", 13 pgs.
"U.S. Appl. No. 14/127,830, Preliminary Amendment filed Dec. 19, 2013", 12 pgs.
"U.S. Appl. No. 14/127,830, Response filed Mar. 23, 2016 to Non Final Office Action dated Jan. 20, 2016", 18 pgs.
"U.S. Appl. No. 14/757,660, Non Final Office Action dated Jun. 14, 2017", 10 pgs.
"U.S. Appl. No. 14/757,660, Preliminary Amendment filed Mar. 3, 2016", 5 pgs.
"U.S. Appl. No. 14/757,660, Response filed Sep. 14, 2017 to Non Final Office Action dated Jun. 14, 2017", 10 pgs.
"U.S. Appl. No. 15/086,558, Preliminary Amendment filed Apr. 1, 2016", 9 pgs.
"U.S. Appl. No. 15/244,676, Notice of Allowance dated Mar. 22, 2018", 11 pgs.
"Belgium Application Serial No. 2013/0503, Belgium Search Report dated Jul. 19, 2013", W/ English Search Report, 9 pgs.
"Belgium Application Serial No. 2013/0503, Response filed May 5, 2014 to Belgium Search Report dated Jul. 19, 2013", W/ English Claims, 13 pgs.
"Brazilian Application Serial No. BR112015004036-5, Voluntary Amendment filed Jan. 13, 2016", w/o English Translation, 55 pgs.
"Chinese Application Serial No. 201310304357.4, Office Action dated Feb. 24, 2016", W/ English Translation, 4 pgs.
"Chinese Application Serial No. 201310304357.4, Preliminary Amendment filed Jun. 20, 2014", W/ English Claims, 8 pgs.
"Chinese Application Serial No. 201380043775.0, Preliminary Amendment filed Oct. 19, 2015", W/ English Claims, 14 pgs.
"Chinese Application Serial No. 201380044760.6, Office Action dated Feb. 5, 2018", With/ English Translation, 18 pgs.
"Chinese Application Serial No. 201380044760.6, Voluntary Amendment filed Jan. 7, 2016", W/ English claims, 5 pgs.
"Chinese Application Serial No. 201380045150,8, Preliminary Amendment Filed Oct. 8, 2015", w/ English Claims, 41 pgs.
"Chinese Application Serial No. 201380045631.9, Voluntary Amendment filed Oct. 20, 2015", W/ English Claims, 27 pgs.

(56) References Cited

OTHER PUBLICATIONS

"Consideration on Reference Signal for E-PDCCH", InterDigital Communications, LLC, ingar i: 3GPP TSG RAN WG | Meeting #67, RI-113932, San, Francisco, USA, (Nov. 9, 2011).
"CR on the addition of the stage-2 agreements on IDC", 3GPP TSG-RAN WG2 Meeting #79, Version 11.20, R2-124311, (Aug. 13-17, 2012), 7 pgs.
"Design of PDSCH muting for CSI-RS in LTE-Advanced", 3G PP TSG RAN WG1 Meeting #62bis R1-105223, (Oct. 4, 2010), 1-5 pgs.
"European Application Serial No. 13819538.3, Extended European Search Report dated Dec. 23, 2015", 8 pgs.
"European Application Serial No. 13819538.3, Office Action dated Mar. 5, 2015", 2 pgs.
"European Application Serial No. 13819538.3, Response filed Sep. 9, 2015 to Office Action dated Mar. 5, 2015", 9 pgs.
"European Application Serial No. 13840542.8, Extended European Search Report dated Apr. 20, 2016", 9 pgs.
"European Application Serial No. 13841050.1, Extended European Search Report dated Mar. 23, 2016", 10 pgs.
"European Application Serial No. 13841346.3, Amendment filed Mar. 16, 2015", 18 pgs.
"European Application Serial No. 13841346.3, Extended European Search Report dated Mar. 3, 2016", 8 pgs.
"European Application Serial No. 13841346.3, Response filed Oct. 4, 2016 to Extended European Search Report dated Mar. 3, 2016", 9 pgs.
"European Application Serial No. 13841732.4, Amendment filed Feb. 13, 2015", 12 pgs.
"European Application Serial No. 13841732.4, Extended European Search Report dated Apr. 7, 2016", 9 pgs.
"Evolved Universal Terrestrial Radio Access (E-UTRA); Physical layer procedures", 3GPP TS 36.213 V10.6.0. Technical Specification Group Radio Access Network. Release 10., (Jun. 2012), 1-125.
"Evolved Universal Terrestrial Radio Access (E-UTRA); Radio Resource Control (RRC);", 3GPP TS 36.331 V11.1.0 (Sep. 2012) Technical Specification Group Radio Access Network; Protocol specification (Release 11), (Sep. 2012), 325 pgs.
"Evolved Universal Terrestrial Radio Access (E-UTRA); User Equipment (UE) procedures in idle mode", 3GPP TS 36.304 V11.1.0. Technical Specification Group Radio Access Network. (Release 11)., (Sep. 2012), 33 pgs.
"Finnish Application Serial No. 20135776, Office Action dated Apr. 9, 2014", English translation, 6 pgs.
"Finnish Application Serial No. 20135776, Office Action dated Jul. 3, 2014", W/ English Translation, 2 pgs.
"Finnish Application Serial No. 20135776, Response filed Jun. 23, 2014 Office Action dated Apr. 9, 2014", W/ English Claims, 13 pgs.
"French Application Serial No. 1357011, Office Action dated Nov. 26, 2013", w/ No Translation, 2 pgs.
"French Application Serial No. 1357011, Response filed Jan. 17, 2014 to Office Action dated Nov. 26, 2013", English claims, 5 pgs.
"HARQ-ACK PUCCH Resources in Response to E-PDCCH Detections", Samsung, R1-121647, 3GPP, (Mar. 20, 2012).
"HARQ-ACK Transmission in Response to E-PDCCH Detection", R1-120193, 3GPP TSG RAN WG1 #68. Samsung., (Feb. 2012), 3 pgs.
"International Application Serial No. PCT/US2013/044756, International Preliminary Report on Patentability dated Jan. 29, 2015", 6 pgs.
"International Application Serial No. PCT/US2013/044756, International Search Report dated Nov. 15, 2013", 3 pgs.
"International Application Serial No. PCT/US2013/044756, Written Opinion dated Nov. 15, 2013", 4 pgs.
"International Application Serial No. PCT/US2013/058153, International Preliminary Report on Patentability dated Apr. 9, 2015", 7 pgs.
"International Application Serial No, PCT/US2013/058153, International Search Report dated Dec. 13, 2013", 3 pgs.
"International Application Serial No. PCT/US2013/058153, Written Opinion dated Dec. 13, 2013", 5 pgs.
"International Application Serial No. PCT/US2013/060800, International Preliminary Report on Patentability dated Apr. 9, 2015", 6 pgs.
"International Application Serial No, PCT/US2013/060800, International Search Report dated Jan. 16, 2014", 3 pgs.
"International Application Serial No. PCT/US2013/060800, Written Opinion dated Jan. 16, 2014", 4 pgs.
"International Application Serial No. PCT/US2013/061379, International Preliminary Report on Patentability dated Apr. 9, 2015", 9 pgs.
"International Application Serial No. PCT/US2013/061379, International Search Report dated Jan. 2, 2014", 3 pgs.
"International Application Serial No. PCT/US2013/061379, Written Opinion dated Jan. 2, 2014", 7 pgs.
"International Application Serial No. PCT/US2013/062132, International Preliminary Report on Patentability dated Apr. 9, 2015", 8 pgs.
"International Application Serial No. PCT/US2013/062132, International Search Report dated Jan. 28, 2014", 3 pgs.
"International Application Serial No. PCT/US2013/062132, Written Opinion dated Jan. 28, 2014", 6 pgs.
"International Application Serial No. PCT/US2013/062210, International Preliminary Report on Patentability dated Apr. 9, 2015", 15 pgs.
"International Application Serial No. PCT/US2013/062210, International Search Report dated Feb. 28, 2014", 4 pgs.
"International Application Serial No. PCT/US2013/062210, Invitation to Pay Additional Fees and Partial Search Report dated Dec. 16, 2013", 7 pgs.
"International Application Serial No. PCT/US2013/062210, Written Opinion dated Feb. 28, 2014", 13 pgs.
"International Application Serial No. PCT/US2013/062340, International Preliminary Report on Patentability dated Apr. 9, 2015", 8 pgs.
"International Application Serial No. PCT/US2013/062340, International Search Report dated Jan. 28, 2014", 6 pgs.
"International Application Serial No. PCT/US2013/062340, Written Opinion dated Jan. 28, 2014", 6 pgs.
"International Application Serial No. PCT/US2013/062379, International Preliminary Report on Patentability dated Apr. 9, 2015", 9 pgs.
"International Application Serial No. PCT/US2013/062379, International Search Report dated Jan. 6, 2014", 6 pgs.
"International Application Serial No. PCT/US2013/062379, Written Opinion dated Jan. 6, 2014", 7 pgs.
"International Application Serial No. PCT/US2013/062427, International Preliminary Report on Patentability dated Apr. 9, 2015", 8 pgs.
"International Application Serial No. PCT/US2013/062427, International Search Report dated Jan. 6, 2014", 3 pgs.
"International Application Serial No. PCT/US2013/062427, Written Opinion dated Jan. 6, 2014", 6 pgs.
"Japanese Application Serial No. 2015-516247, Office Action dated Feb. 9, 2016", W/ English Translation, 4 pgs.
"Japanese Application Serial No. 2015-528726, Office Action dated Nov. 4, 2015", W/ English Translation, 9 pgs
"Japanese Application Application Serial No. 2015-528726, Response filed Feb. 4, 2016 to Office Action dated Nov. 4, 2015", W/ English Translation, 11 pgs.
"Japanese Application Serial No. 2015-528730, Office Action dated Nov. 4, 2015", W/ English Translation, 11 pgs.
"Japanese Application Serial No. 2015-528730, Response filed Feb. 22, 2016 to Office Action dated Nov. 4, 2015", (English Translation of Claims), 12 pgs.
"Japanese Application Serial No. 2015-534731, Notice of Reasons for Rejection dated Mar. 1, 2016", W/ English Translation, 8 pgs.
"Japanese Application Serial No. 2016-030724, Examiners Decision of Final Refusal dated Aug. 22, 2017", W/ English Translation, 11 pgs.
"Japanese Application Serial No. 2016-030724, Office Action dated Apr. 11, 2017", With English Translation, 12 pgs.

(56) References Cited

OTHER PUBLICATIONS

"Japanese Application Serial No. 2016-030724, Office Action dated Dec. 6, 2016", W/ English Translation, 10 pgs.
"Japanese Application Serial No. 2016-030724, Response filed Feb. 28, 2017 to Office Action dated Dec. 6, 2016", w/ English Claims, 19 pgs.
"Japanese Application Serial No. 2016-030724, Response filed Jul. 7, 2017 Office Action dated Apr. 11, 2017", w/ English Claims, 15 pgs.
"Korean Application Serial No, 10-2015-7005276, Office Action dated May 15, 2017", W/ English Translation, 5 pgs.
"Korean Application Serial No. 10-2015-7005276, Office Action dated Oct. 21, 2016", with English Translation, 7 pgs.
"Korean Application Serial No. 10-2015-7005276, Response filed Jul. 7, 2017 to Office Action dated May 15, 2017", w/ English Claims, 14 pgs.
"Korean Application Serial No. 10-2015-7005276, Response filed Dec. 21, 2016 to Office Action dated Oct. 21, 2016", w/ English Claims, 18 pgs.
"Korean Application Serial No. 10-2015-7005286, Amendment filed Feb. 27, 2015", W/ English Agent's Note on Amendments, 5 pgs.
"Korean Application Serial No. 10-2015-7005286, Office Action dated Mar. 28, 2016", W/ English Translation, 17 pgs.
"Korean Application Serial No. 2015-7004962, Notice of Preliminary Rejection dated Feb. 5, 2016", (English Translation), 11 pgs.
"Netherlands Application Serial No. 2011185, Office Action dated May 27, 2015", w/ English Translation, 10 pgs.
"Netherlands Application Serial No. 2011185, Response filed Aug. 3, 2015 to Office Action dated May 27, 2015", W/ English Claims, 9 pgs.
"Open issues of in-device coexistence", 3GPP TSG RAN WG2 Meeting #79bis, R2-124968, (Oct. 8-12, 2012), 2 pgs.
"PUCCH Resource Allocation Corresponding to ePDCCH", R1-120666, 3GPP TSG RAN WG1 Meeting #68. ASUSTEK., (Feb. 2012), 2 pgs.
"PUCCH resource allocation for E-PDCCH", R1-120329, 3GPP TSG RAN1 #68. Pantech., (Feb. 2012), 2 pgs.
"PUCCH resource for ePDCCH", R1-123266, 3GPP TSG RAN WG1 Meeting #70. Qingdao, China. Sharp., [Online] retrieved from the internet: <URL:http://www.3gpp.org/ftp/tsg_ranAA/G1_RL1/TSGR1_70/Docs/>, (Aug. 13, 2012), 8 pgs.
"PUCCH resource mapping with ePDCCH", R1-114066, 3GPP TSG RAN WG1 Meeting #67. Alcatel-Lucent Shanghai Bell, Alcatel-Lucent., (Nov. 2011), 2 pgs.
"R1-121935: Interference Measurement Mechanism for Rel-11", 3GPP TSG RAN WG1 Meeting #69, (May 2012), 10 pgs.
"R1-124046: Final Report of 3GPP TSG RAN WG1 #70 v1.0.0", 3GPP TSG RAN WG1 Meeting #70bis, (Oct. 2012), 118 pgs.
"RAN2 CR for Rel-11 WI Core part: Signalling and procedure for interference avoidance for in-device coexistence", 3GPP TSG-RAN Meeting #57, RP-121379, (Sep. 4-7, 2012), 1 pg.
"Remaining Issues on Resource Allocation for TDD PUCCH format 3", LG Electronics, R1-111692, 3GPP, (May 3, 2011).
"Report of email discussion [78#49] LTE/IDC: IDC Indication", Huawei, 3GPP TSG RAN WG2 Meeting #79, R2-123534, (Aug. 7, 2012), 41 pgs.
"Report of email discussion [78#50] LTE/IDC: TDM DRX Details", Ericsson, 3GPP TSG-RAN WG2#79 meeting, R2-123718, [Online] Retrieved from the Internet :<http://www.3gpp.org/ftp/tsg_ran/WG2_RL2/TSGR2_79/Docs/>, (Aug. 7, 2012), 7 pgs.
"Spanish Application Serial No. P201331103, Office Action dated Apr. 28, 2015", w/ English Translation, 8 pgs.

"Spanish Application Serial No. P201331103, Office Action dated Jun. 30, 2015", in English, 3 pgs.
"Spanish Application Serial No. P201331103, Office Action dated Sep. 22, 2014", W/ English Translation, 10 pgs.
"Spanish Application Serial No. P201331103,Respnse filed Jun. 22, 2015 to Office Action dated Apr. 28, 2015", W/ English Claims, 19 pgs.
"Spanish Application Serial No. P201331103,Response filed Jan. 30, 2015 to Office Action dated Sep. 22, 2014", W/ English Claim chart, 2 pgs.
"Swedish Application Serial No. 1350906-2, Office Action dated Feb. 19, 2015", w/ English Translation, 32 pgs.
"Swedish Application Serial No. 1350906-2, Response filed May 19, 2015 to Office Action dated Feb. 19, 2015", W/ English Claims, 17 pgs.
"Taiwanese Application Serial No. 102125395, Office Action dated Jun. 22, 2015", w/ English Translation, 22 pgs.
"Taiwanese Application Serial No. 102125395, Response filed Sep. 21, 2015 to Office Action dated Jun. 22, 2015", W/ English Claims, 28 pgs.
"Taiwanese Application Serial No. 102125395, Response filed Oct. 16, 2015 to Office Action dated Jun. 22, 2015", W/ Partial English Claims, 6 pgs.
"Transmission mode and DCI content for Release 11", Renesas Mobile Europe Ltd, ingar i: 3GPP TSG-RAN WGI Meeting #69, R1-122357, Prague, Czech Republic, (May 12, 2012).
"UE assumption on colocation of antennas", Renesas Mobile Europe Ltd, ingar i: 3GPP TSG-RAN WG 1 Meeting #69, R 1-122334, Prague, Czech, Republic, (May 12, 2012).
"Views on PUCCH Resource Allocation for ePDCCH", NTT Docomo, R1-123554, 3GPP, (Aug. 5, 2012).
"WF on PUCCH Format 1a/1b resource allocation for ePDCCH based HARQ-ACKs", Sharp, Nokia Siemens Networks, Nokia, Samsung, Docomo, WF R1-123975, 3GPP, (Aug. 17, 2012).
Alcatel-Lucent, Shanghai Bell, "Further Discussion of Quasi-colocated antenna ports", 3GPP TSG-RAN1 Meeting #69 R1-122458, (May 13, 2012), 1-3 pgs.
Chou, Joey, et al., "M2M Polling services", IEEE C802.16p-11/0016r1. IEEE 802.16 Broadband Wireless Access Working Group., [Online] Retrieved From Internet: <http://dot16.org/ul_archive/archive11/archive.shtml>, (Mar. 13, 2011), 12 pgs.
Davies, Thomas, "Linux Ethernet Bonding Driver HOWTO", [Online]. Retrieved from the Internet: <URL: https://www.kernel.org/doc/Documentation/networking/bonding.txt>, (Apr. 27, 2011), 46 pgs.
Fazackerley, et al., "Cluster head selection using RF signal strength", IEEE lectrical and Computer Engineering, (2009), 334-338.
Hayashi, Toshiki, "Evolved Packet Core (EPC) Network Equipment for Long Term Evolution (LTE)", Fujitsu Sci. Tech, J., vol. 48, No. 1, (Jan. 2011), 17-20.
Huawei, et al., "36.331 CR introducing In-Device Coexistence (IDC)", 3GPP TSG-RAN?57 RP-121404, [Online]. Retrieved from the Internet: <http://www.3gpp.org/ftp/tsg_ran/TSG_RAN/TSGR_57/Docs/RP-121404.zip>, (Sep. 5, 2012), 32 pgs.
Huawei, Hisilicon, "Remaining details of CSI-RS configuration", 3GPP TSG-RAN WG1#68b R1-120984, [Online]. Retrieved from the Internet:, (Mar. 30, 2012).
Je, Hui Won, et al., "Long-Term Channel Information-Based CoMP Beamforming in LTE-Advanced Systems", 2011 IEEE Global Telecommunications Conference (GLOBECOM 2011), (2011), 1-6.
Samsung, "HARQ-ACK PUCCH Resources in Response to ePDCCH Detections", R1-122259, 3GPP TSG RAN WG1 #69. Prague, Czech Republic. Samsung., (May 12, 2012), 2 pgs.
"Chinese Application Serial No. 201380044760.6, Office Action dated Oct. 8, 2018", w/English Translation, 15 pgs.

* cited by examiner

DISCONTINUOUS RECEPTION (DRX) ENHANCEMENTS IN LTE SYSTEMS

RELATED APPLICATIONS

This application is a continuation of U.S. patent application Ser. No. 15/244,676, filed Aug. 23, 2016, which is a continuation of U.S. patent application Ser. No. 14/757,660, filed Dec. 23, 2015, which is a continuation of and claims the benefit of priority under 35 U.S.C. § 120 to U.S. patent application Ser. No. 14/125,749, filed on Dec. 12, 2013, which is a U.S. National Stage Filing under 35 U.S.C. 371 from International Application No. PCT/US2013/062210, filed on Sep. 27, 2013, and published as WO 2014/052774 A 1 on Apr. 3, 2014, which claims the benefit of priority under 35 U.S.C. § 119(e) to U.S. Provisional Ser. No. 61/707,784, filed Sep. 28, 2012, and entitled "ADVANCED WIRELESS COMMUNICATION SYSTEMS AND TECHNIQUES," which are hereby incorporated by reference in their entireties.

BACKGROUND

In LTE Release-11, discontinuous reception (DRX) is used as the time domain multiplexing (TDM) solution to solve in-device coexistence problem. In UE assistance information sent from UE to eNB, UE can report DRX starting offset, which is useful to reduce or avoid WiFi beacon collision. However, reporting a single DRX starting offset value has the problem that there is restriction on eNB scheduling flexibility. For example, if eNB already uses the same DRX starting offset for many other UEs, then using the same DRX starting offset results in that many subframes are overloaded while other subframes are underloaded.

In LTE Release-11, Enhanced Physical Downlink Control Channel (EPDCCH) is introduced. In E-PDCCH, each DCI is transmitted over one subframe. This is different from PDCCH which transmits within a first few symbols in a subframe. User equipment (UE) may monitor UE specific search space in ePDCCH when ePDCCH is configured. However, the UE also monitors common search space in PDCCH.

In LTE, an inactivity timer is started at the subframe when the UE receives initial DL and UL grant and counts from the next subframe. The PDCCH decoding may finish before the next subframe. However, if ePDCCH is introduced, the UE starts ePDCCH decoding in the end of the subframe because the UE needs to receive the subframe to decode the ePDCCH DCI message. Even if the UE decoding time is very short, the UE would not be able to complete the ePDCCH decoding in the next subframe at the earliest. Therefore, the UE could not determine whether the initial DL or UL grant is received in the next subframe. Due to the latency with ePDCCH decoding, the UE may not able to start the inactivity timer at the subframe.

If the next subframe is an active subframe, there is no problem even if the UE cannot start inactivity timer in the subframe in which the UE receives initial DL or UL grant. However, if the next subframe is an inactive subframe, the UE cannot monitor PDCCH or ePDCCH even if the active time is extended with inactivity timer because the decoding in ePDCCH has not completed.

DETAILED DESCRIPTION

Embodiments described herein provide DRX enhancements in LTE systems. A system control module is provided for controlling communications via a communications interface. A processor is coupled to the system control module and is arranged to implement an inactivity timer and an on-duration timer for determining an active time for monitoring subframes on the physical downlink control channel for control signals, the processor further monitoring subframes after the active time.

Figure 1:
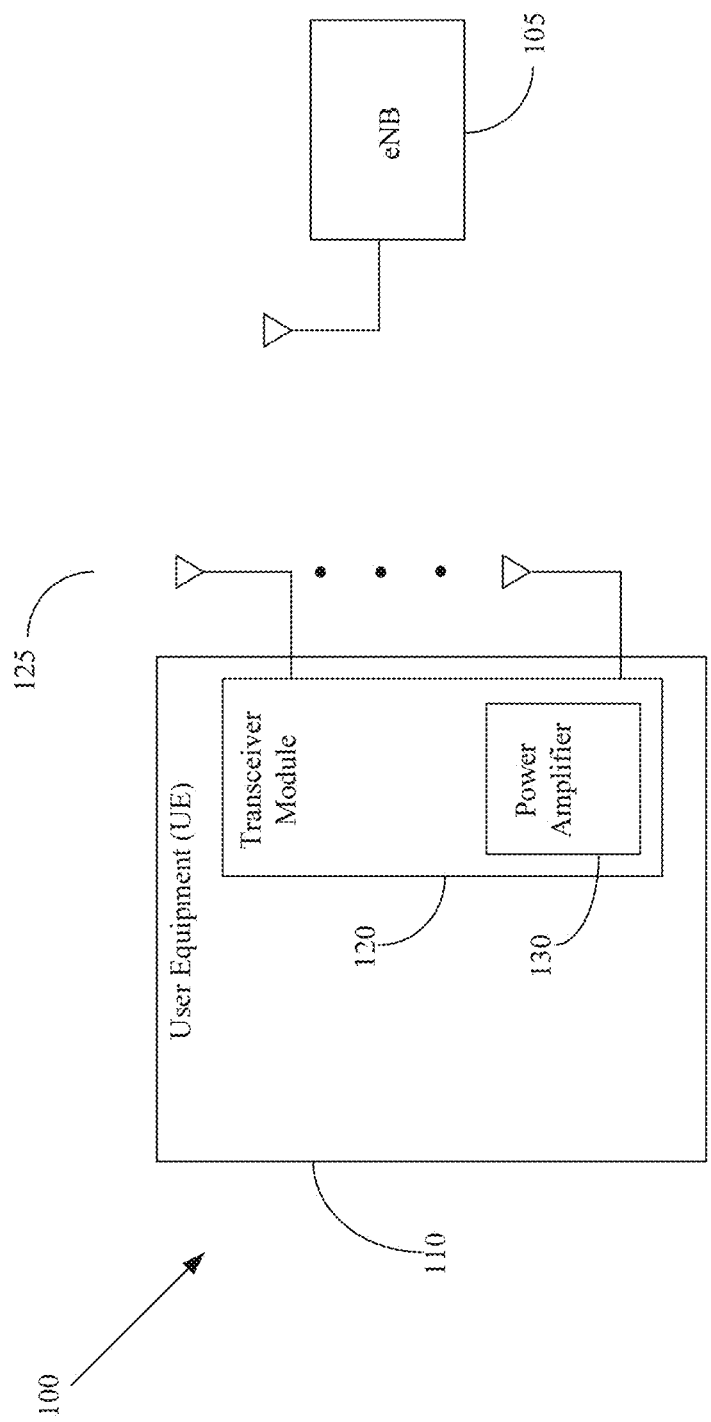
FIG. 1 schematically illustrates a high-level example of a network system comprising a UE and an eNB, in accordance with various embodiments.

FIG. 1 schematically illustrates a wireless communication network 100 in accordance with various embodiments. Wireless communication network 100 (hereinafter "network 100") may be an access network of a 3GPP LTE network such as evolved universal terrestrial radio access network ("E-UTRAN"). The network 100 may include an eNB 105, configured to wirelessly communicate with a UE 110.

As shown in FIG. 1, the UE 110 may include a transceiver module 120. The transceiver module 120 may be further coupled with one or more of a plurality of antennas 125 of the UE 110 for communicating wirelessly with other components of the network 100, e.g., eNB 105. The antennas 125 may be powered by a power amplifier 130 which may be a component of the transceiver module 120, as shown in FIG. 1, or may be a separate component of the UE 110. In one embodiment, the power amplifier provides the power for transmissions on the antennas 125. In other embodiments, there may be multiple power amplifiers on the UE 110. Multiple antennas 125 allow the UE 110 to use transmit diversity techniques such as spatial orthogonal resource transmit diversity (SORTD).

Figure 2:
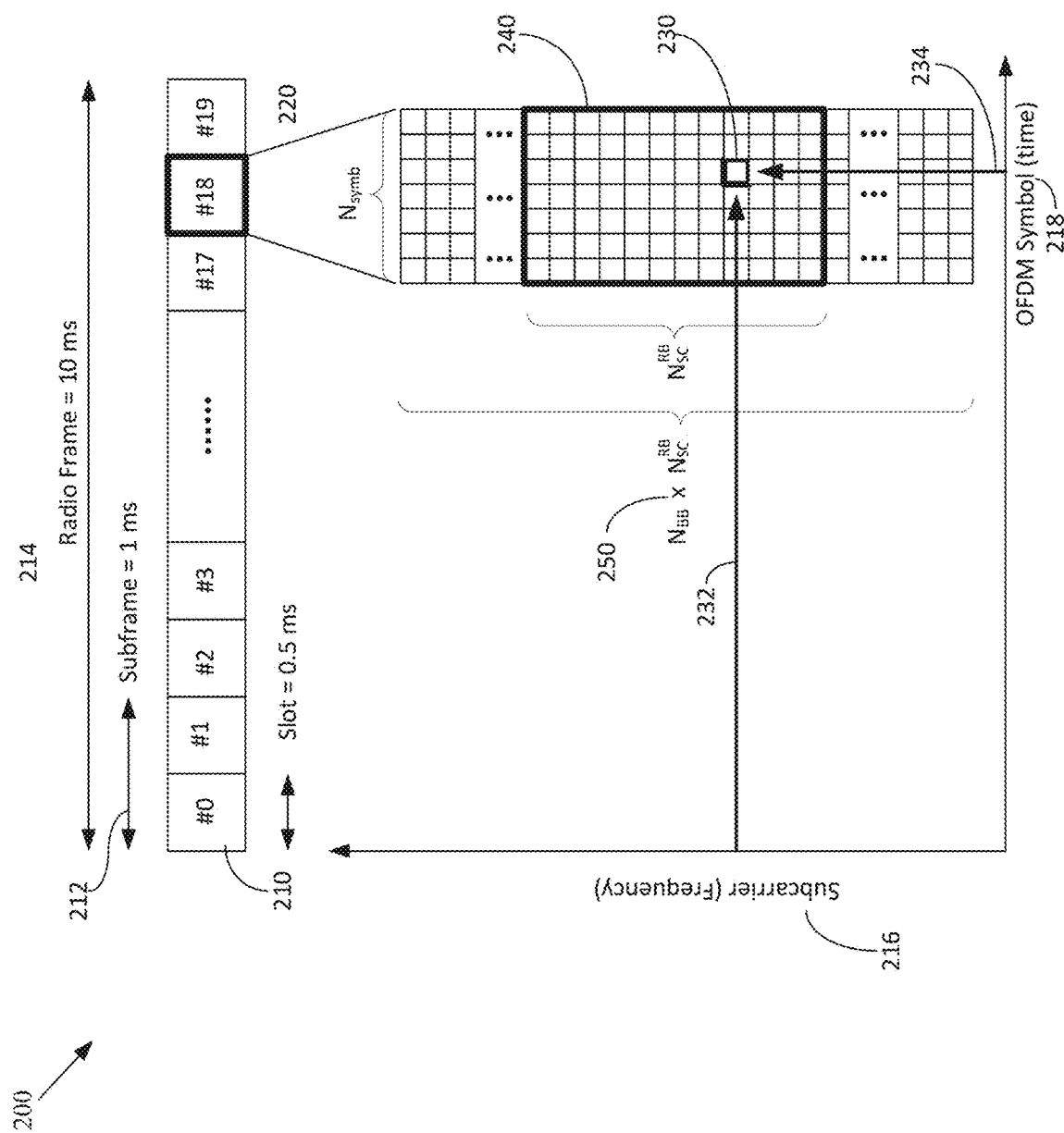
FIG. 2 illustrates a radio frame structure according to an embodiment.

FIG. 2 illustrates a radio frame structure 200 according to an embodiment. In FIG. 2, the radio frame 200 has an overall length of 10 ms 214. This is then divided into a total of 20 individual slots 210. Each subframe 212 includes of two slots 210 of length 0.5 ms, and each slot 210 contains a number of OFDM symbols, Nsymb 220. Thus, there are 10 subframes 212 within frame 200. Subframe 418 is shown expanded with reference to a subcarrier (frequency) axis 216 and an OFDM symbol (time) axis 218.

A resource element (RE) 230 is the smallest identifiable unit of transmission and includes a subcarrier 232 for an OFDM symbol period 234. Transmissions are scheduled in larger units called resource blocks (RBs) 240 which comprise a number of adjacent subcarriers 232 for a period of one 0.5 ms timeslot. Accordingly, the smallest dimensional unit for assigning resources in the frequency domain is a "resource block" (RB) 240, i.e., a group of $N_{sc}^{RB}$ adjacent subcarriers 232 constitute a resource block (RB) 240. Each subframe 212 includes "NRB" resource blocks, i.e., the total number of the subcarriers within subframe NRB×$N_{sc}^{RB}$ 250.

Figure 3:
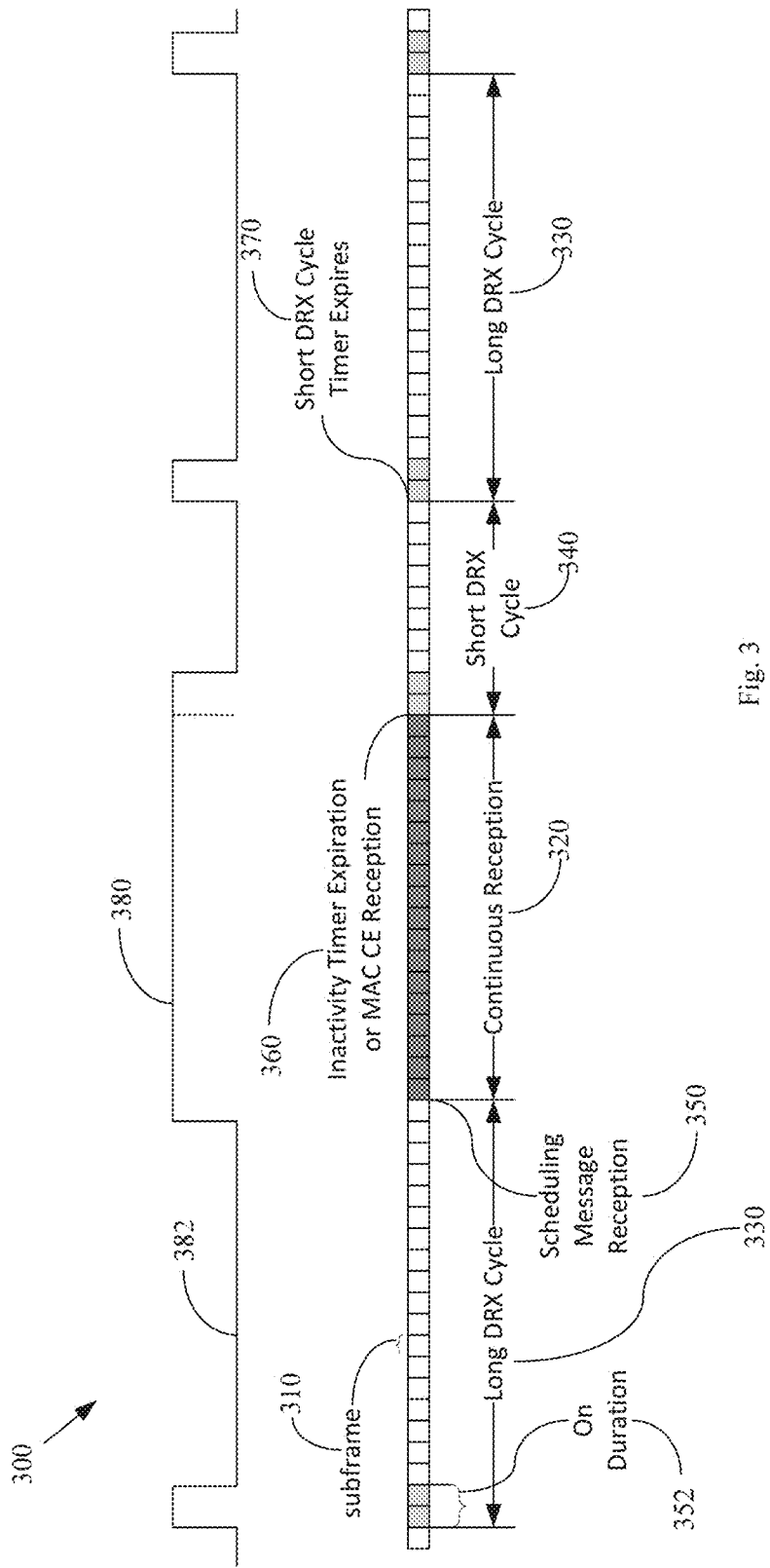
FIG. 3 illustrates a discontinuous reception (DRX) according to an embodiment.

FIG. 3 illustrates a discontinuous reception (DRX) 300 according to an embodiment. Normally, user equipment (UE) is used to read PDCCH for allocations in the subframes. However, an inactivity timer is used to time the duration in downlink subframes that the UE waits to successfully decode a PDCCH, from the last successful decoding of a PDCCH. If the timer fails, the UE will re-enter a discontinuous reception (DRX) mode.

In FIG. 3, subframes 310 are received by a UE. The subframes may be characterized as part of a continuous reception 320, a long DRX cycle 330 or a short DRX cycle 340. UE checks for scheduling message 350, which may be indicated by a C-RNTI on the PDCCH during the on duration 352. The on duration 352 may be for a long DRX cycle 330 or a short DRX cycle 340 depending on the current active cycle. The on duration 352 is the duration in downlink subframes 310 that the UE waits for, after waking up from DRX to receive PDCCHs. If the UE successfully decodes a PDCCH, the UE stays awake and starts an inactivity timer.

When a scheduling message 350 is received during an on duration 352, the UE starts the DRX inactivity timer and monitors the PDCCH in the subframes 310. During this monitoring period, the UE may be in a continuous reception mode 320. If a scheduling message 350 is received and the DRX inactivity timer is running, the DRX inactivity timer is restarted by the UE. When the inactivity timer expires 360, the UE moves into a short DRX cycle 340 and a DRX short cycle timer is initiated, The short DRX cycle 340 may be initiated by a media access control (MAC) control element. When the short DRX cycle expires 370, the UE moves into a long DRX cycle 330.

Figure 4:
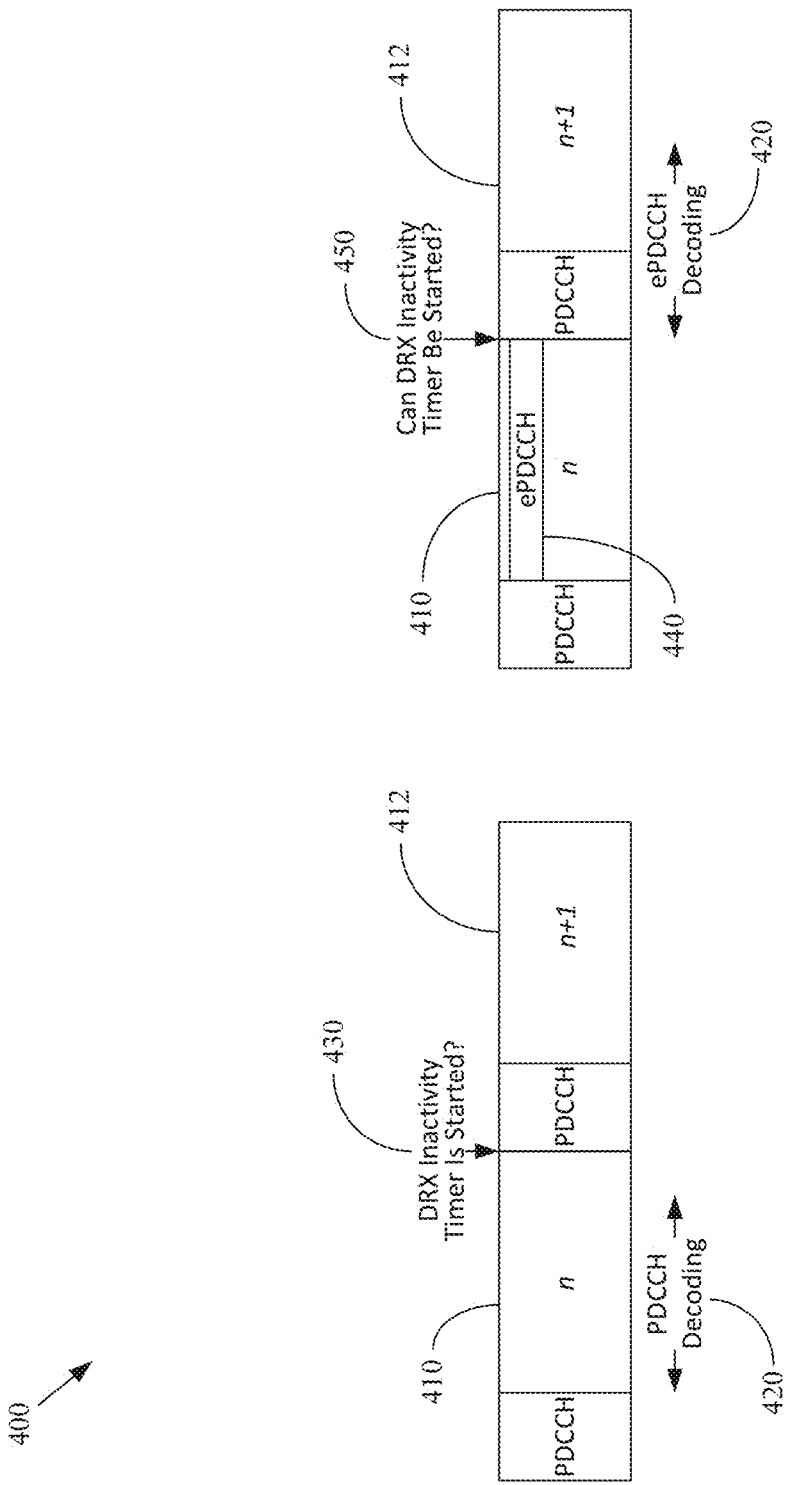
FIGS. 4a-b illustrate the handling of an inactivity timer according to an embodiment.

FIGS. 4a-b illustrate the handling of an inactivity timer 400 according to an embodiment. In FIG. 4a, two subframes 410, 412 are shown. A PDCCH 420 is decoded. The UE restarts the inactivity timer 430 following the successful decoding of a PDCCH 420 for a first transmission, i.e., not for retransmissions. The PDCCH decoding 420 may finished before the next subframe.

FIG. 4b shows an ePDCCH 440 is provided in a subframe 410. The UE starts ePDCCH decoding 420 at the end of the subframe because the UE needs to receive the subframe to decode the ePDCCH DCI message. Even if the UE decoding time is very short, the UE may not be able to complete the ePDCCH before the start of the next subframe 412. Therefore, the UE cannot determine whether the initial DL or UL grant is received in the next subframe. Due to the latency with ePDCCH decoding, the UE may not able to start, the inactivity timer 450 at the subframe 412.

If the next subframe 412 is an active subframe, there is no problem even if the HE cannot start the inactivity timer in the subframe 410 in which the UE receives initial DL or UL grant. However, if the next subframe 412 is an inactive subframe, the UE cannot monitor PDCCH or ePDCCH even if the active time is extended with the inactivity timer because the decoding in ePDCCH has not completed.

Figure 5:
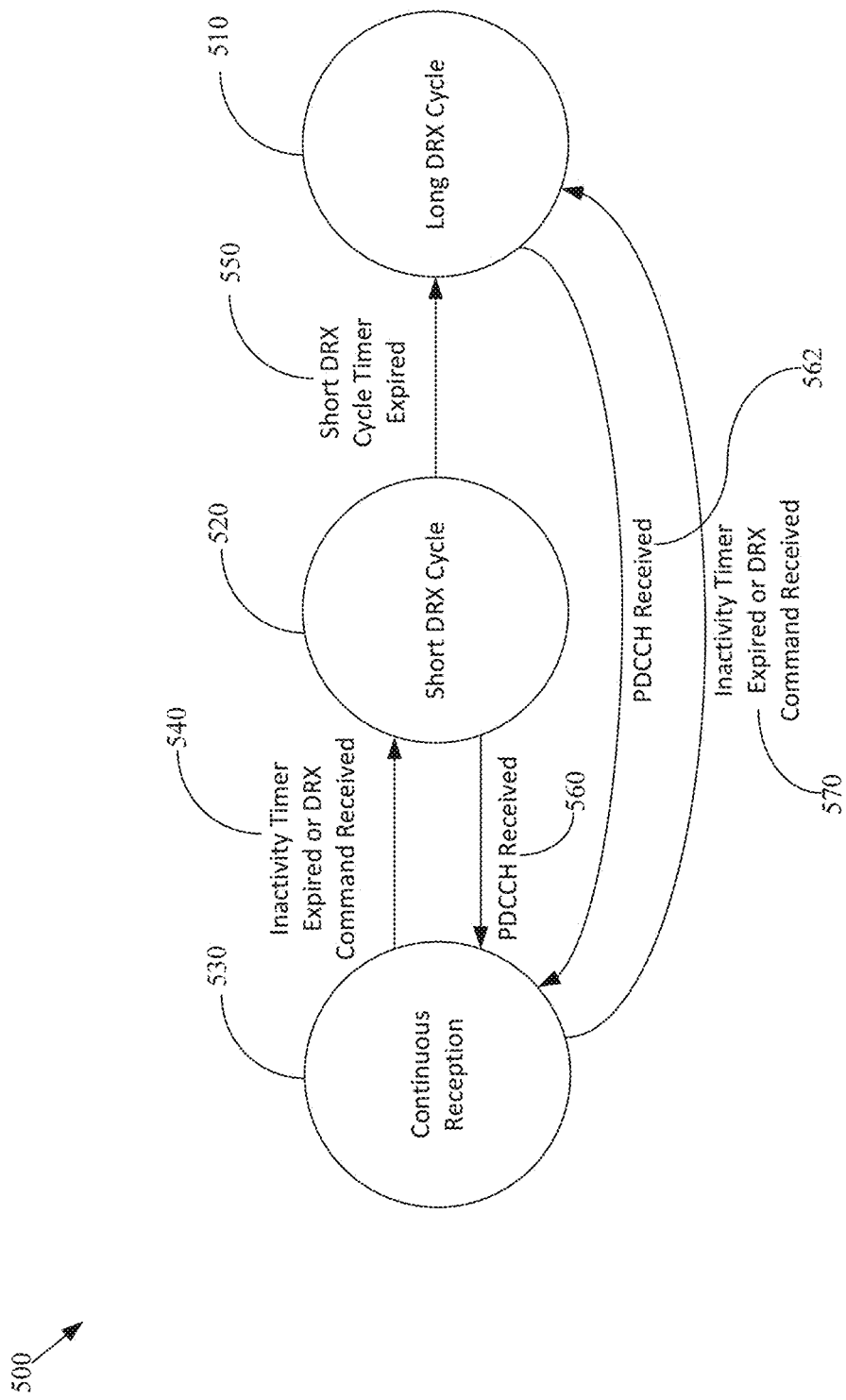
FIG. 5 illustrates the state transitions for DRX according to an embodiment.

FIG. 5 illustrates the state transitions for DRX 500 according to an embodiment. In FIG. 5, states corresponding to the long DRX cycle 510, the short DRX cycle 520, and the continuous reception mode 530 are entered when certain criterion is met. The UE moves from continuous reception mode 530 to a short DRX cycle 520, from the short DRX cycle 520 to a long DRX cycle 510, and from the long DRX cycle 510 to continuous reception mode 530. However, the UE may move between the continuous reception mode 530 and one of the short DRX cycle 520 or the long DRX cycle 510. Transition may be controlled either by timers or by explicit commands from the eNB.

The inactivity timer starts when the UE is in the continuous reception mode 530. If the UE does not receive any new resource allocation information until the expiry of the inactivity timer 540, 570, the UE transits to the next level of the DRX cycle; that is, it transits to a short DRX cycle 520 if configured, and transits 570 to a long DRX cycle 510 otherwise.

When the UE moves into a short DRX cycle 520, the UE starts the short cycle timer. The UE stays in the short DRX cycle 520 until the expiry of the short cycle timer 550, and moves to a long DRX cycle 510 at the expiry of the short cycle timer 550. If the UE receives any resource allocation information 560 while the short cycle timer is running, the UE moves from the short DRX cycle 520 to continuous reception mode 530. More specifically the UE immediately moves back to continuous reception mode 530 when the UE receives resource allocation information 560, 562 indicating a new transmission during any of the DRX cycle 510, 520.

In continuous reception mode 530, the UE is monitoring the PDCCH in the subframes. Thus, the continuous reception mode 530 may be matched to the time when the inactivity timer is running. In the short DRX cycle 520 and the long DRX cycle 510, the UE monitors the PDCCH for some of the subframes out of the available subframes. The UE's power consumption can be reduced because the UE monitors a small portion of the possible subframes.

Referring again to FIG. 3, the on duration 380, 352 and the DRX periods 382 are shown. The PDCCH monitoring time in each DRX cycle, continuous reception 320, long DRX cycle 330 and short DRX cycle 340 is called the on duration 380. The on duration 380, 352 is located in the first part of each DRX cycle. More specifically, a DRX cycle includes an on duration during which the UE monitors the PDCCH and the DRX period 382 during which the UE is allowed not to monitor the PDCCH.

The number of subframes or the length of time that a UE uses to monitor the PDCCH in one DRX cycle is controlled by an on duration timer. At the beginning of each DRX cycle, the UE starts the on duration timer and monitors the PDCCH while the on duration timer is running. The length of the on duration timer controls the scheduling flexibility of the eNB. If the length of the on duration timer is one subframe 310, the eNB can send a resource allocation message during that one subframe 310. However, if the length of the on duration timer is more than one subframe, the eNB can select one of the available subframes to send the resource allocation information. This is beneficial to the eNB especially when the PDCCH is heavily loaded. Thus, depending on the length of the on duration timer, the eNB can have flexibility regarding when to send resource allocation information. However, this comes at a cost to the UE, because monitoring of one more subframe means more consumption of the UE's battery.

Figure 6:
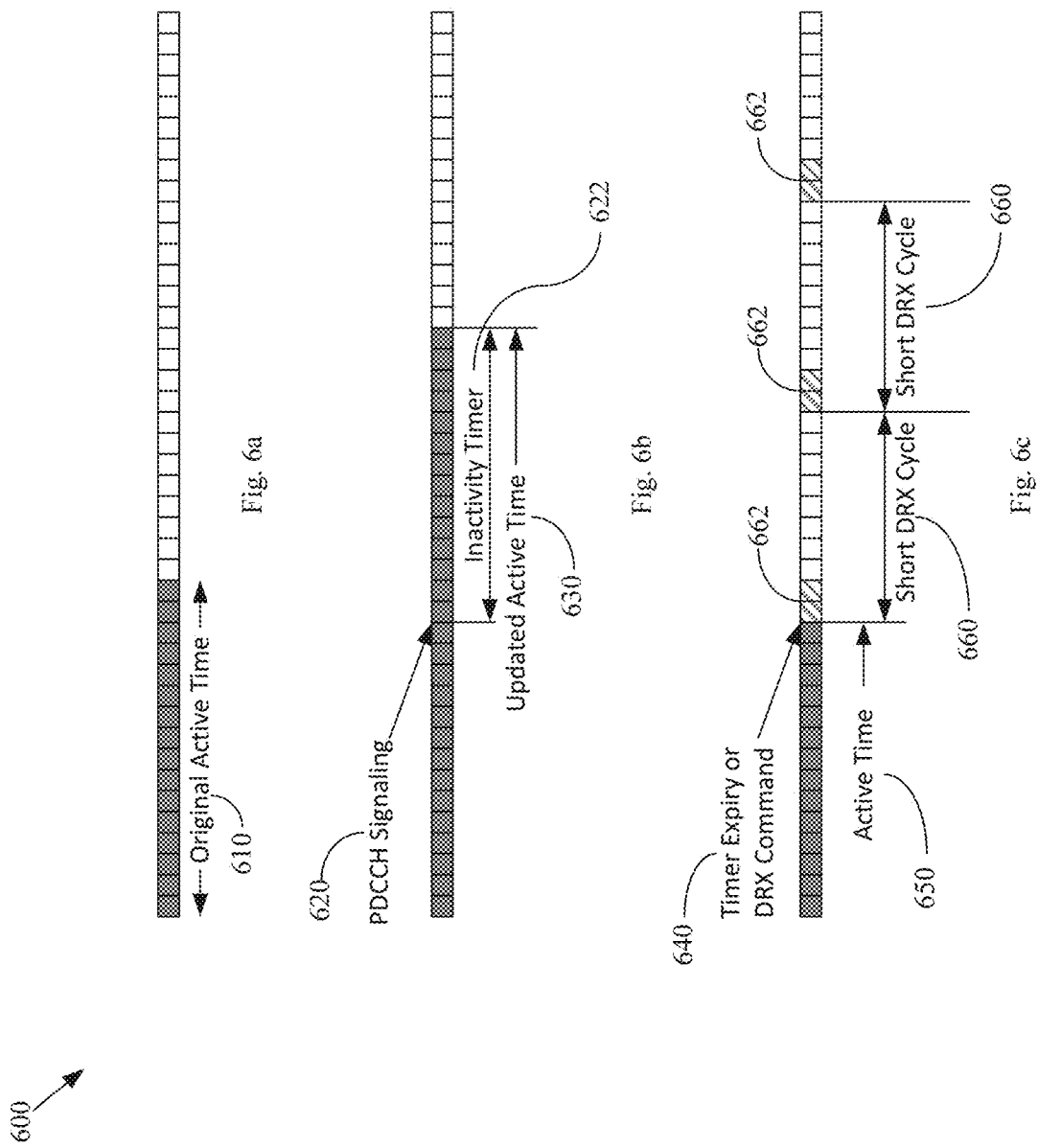
FIGS. 6a-c shows operation of DRX active time according to an embodiment.

FIGS. 6a-c shows operation of DRX active time 600 according to an embodiment. In FIG. 6a, the original active time 610 is shown. The active time 610 is the time when a UE monitors the PDCCH for possible resource allocation information. This active time 610 includes the time period when timers such as inactivity timer, retransmission timer, and on duration timer are running. Regardless of the DRX cycle used, the UE monitors the PDCCH during an on duration.

FIG. 6b shows the extension of the active time according to an embodiment. When resource allocation information is received during the active time, the UE starts or restarts the inactivity timer and monitors for receipt of PDCCH signaling 620 in a subframe while the inactivity timer 622 is running. Thus, resource allocation information received during the active time effectively causes an extension of the active time 630.

FIG. 6c illustrates the end of the active time according to an embodiment. At the expiry of the inactivity timer or on receipt of a DRX Command 640, e.g., MAC CE, the UE stops the active time 650 and moves into a short DRX cycle 660. Alternative, a long DRX cycle (not shown in FIG. 6c) may be entered. The UE monitors for PDCCH during the duration on periods 662.

Figure 7:
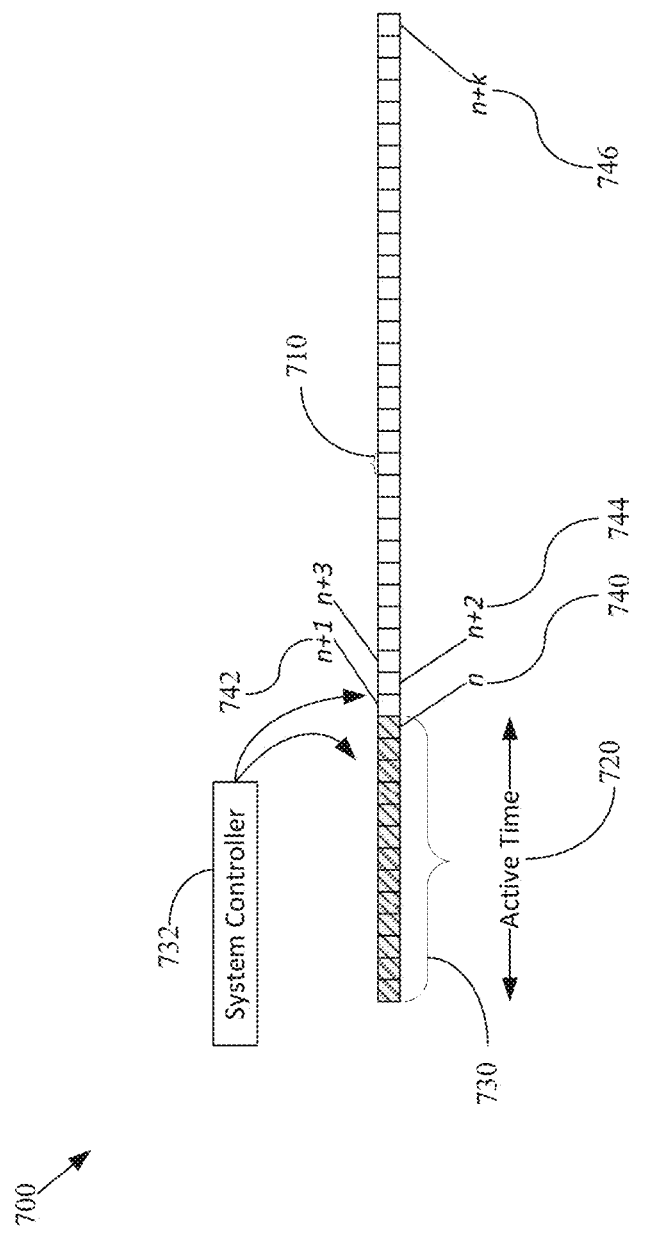
FIG. 7 illustrates DRX enhancements in LTE systems according to an embodiment.

FIG. 7 illustrates DRX enhancements in LTE systems 700 according to an embodiment. In FIG. 7, subframes 710 are shown with an active time 720 set for monitoring a group of the subframes 730. For ePDCCH support, the controller module 732 of the UE monitors PDCCH or ePDCCH in the group of subframes 730 and then also monitors subframes after the active time 720 until the UE knows whether the active time 720 has been extended. This means that the UE receives PDCCH or ePDCCH in the subframe regardless of the decoding time used for the control channel including PDCCH and ePDCCH if the associated subframe is within the active time 720.

For example, assuming that the end of the active time is subframe (n) 740, the system controller 732 of the UE monitors PDCCH or ePDCCH in the subframe (n+1) 742, (n+2) 744, . . . (n+k) 746. Herein, k is a number that is determined based on the UE processing time for ePDCCH. The time for ePDCCH decoding time may be around 0.5 ms. Therefore, the UE monitors PDCCH or ePDCCH in the subframe (n+1), where the subframe (n) 740 is the end of active time 720. The UE finishes decoding ePDCCH of subframe (n) 740 within the time period of subframe (n+1) 742. The UE may need to actually decode ePDCCH of subframe (n+1) 742, although ePDCCH there is no initial grant to the UE in the subframe (n) 740 after the decoding.

Figure 8:
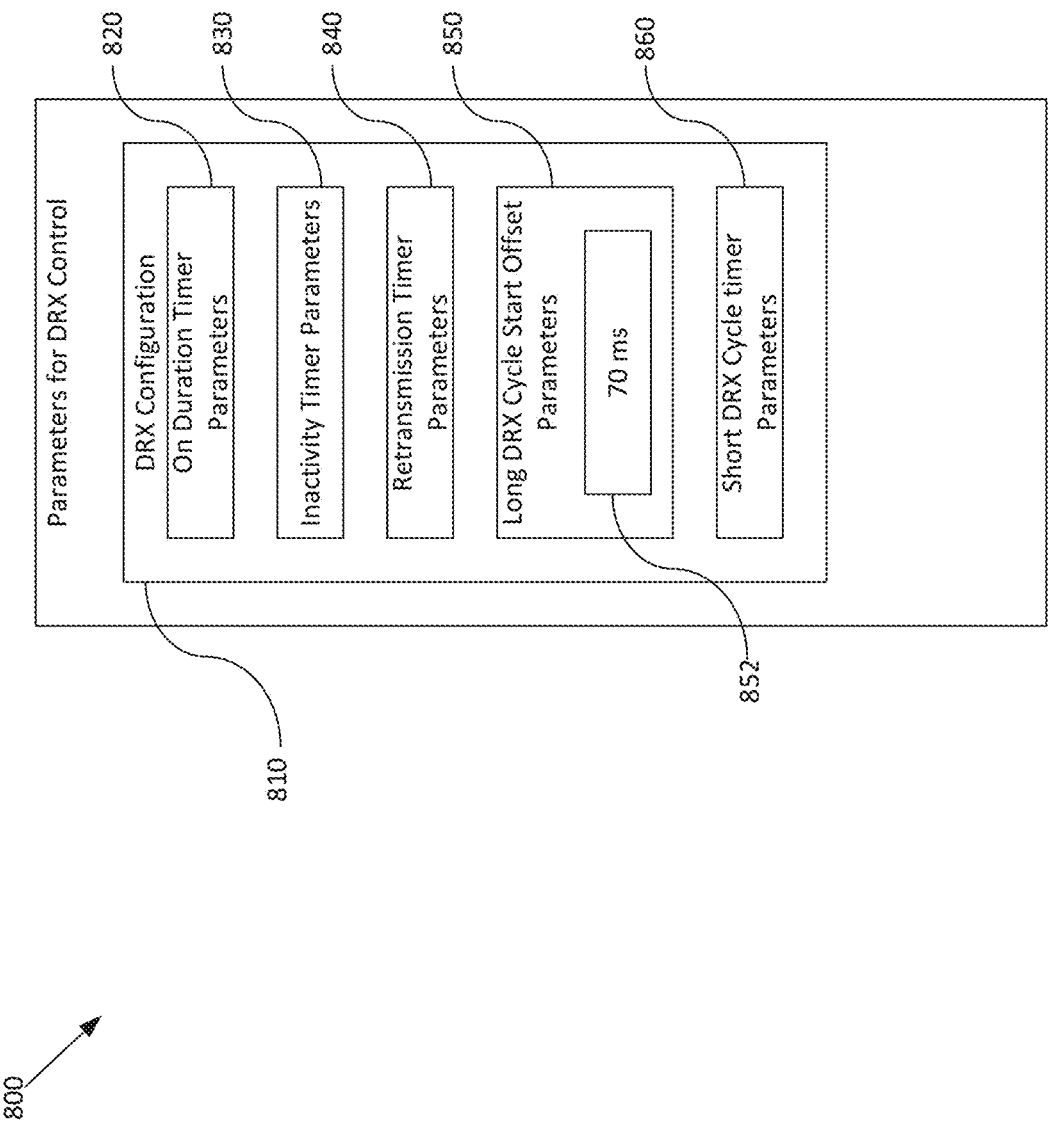
FIG. 8 illustrates parameters for DRX control according to an embodiment.

FIG. 8 illustrates parameters for DRX control 800 according to an embodiment. In FIG. 8, the DRX configuration 810 includes parameters for setting the on duration timer 820, the inactivity timer 830, the retransmission timer 840, the long DRX cycle start offset 850 and the short DRX cycle timer 860. A coexistence-friendly value 852 is added for the long DRX cycle 850 for LTE+Bluetooth voice scenario parameter to support 70 ms long DRX cycle values. For the long DRX cycle start offset 850, a value 852 of 70 ms may be used to support 70 ms long DRX cycle values. A long DRX cycle of 70 ms, for example, is beneficial because, for LTE TDD UL/DL Configuration 0, the HARQ timing period is 70 ms. If 70 ms long DRX cycle value is not supported, then the HARQ timing will be broken for the TDD UL/DL Configuration 0.

Figure 9:
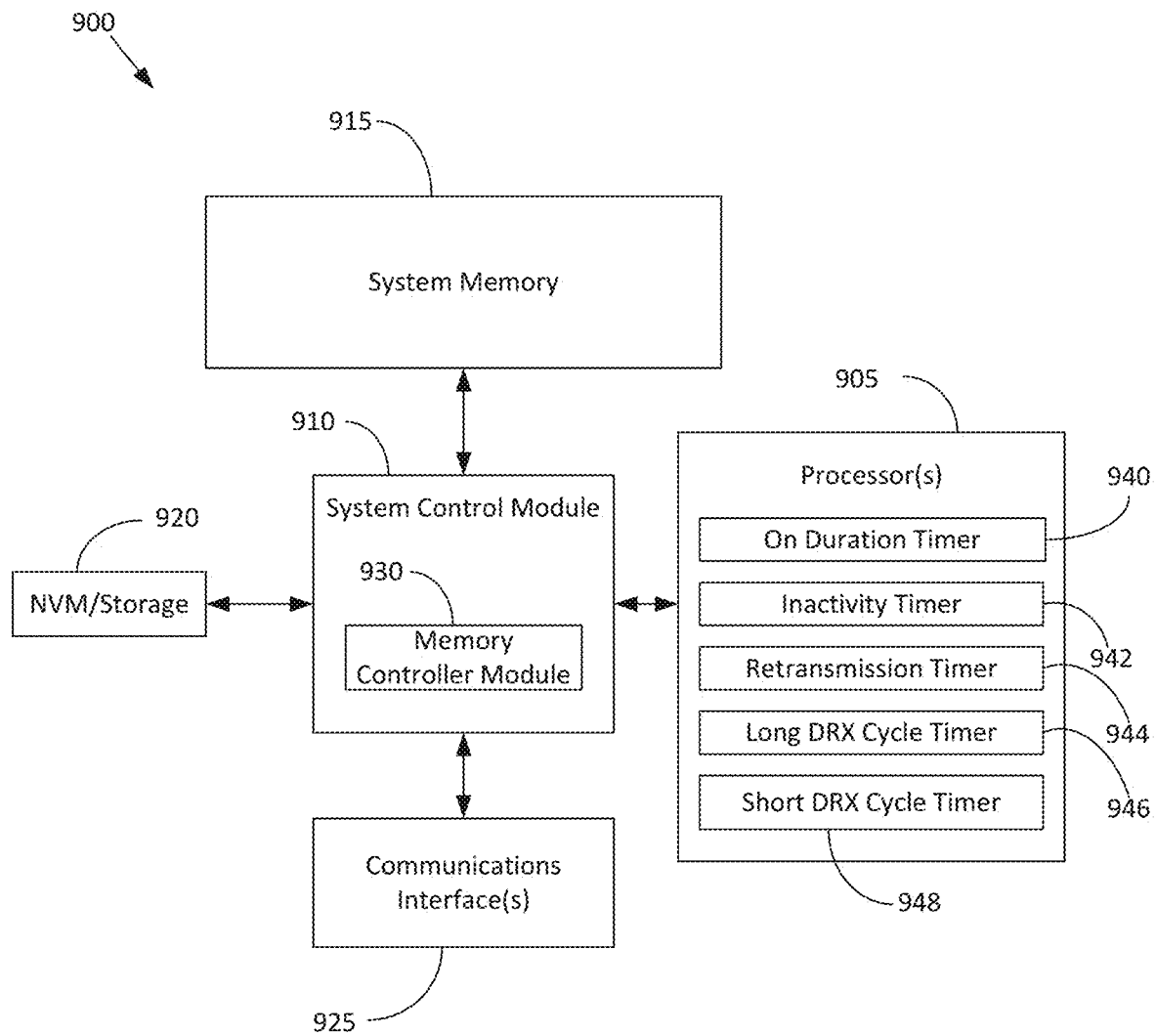
FIG. 9 schematically illustrates an example system that may be used to practice various embodiments described herein.

FIG. 9 schematically illustrates an example system 900 that may be used to practice various embodiments described herein. FIG. 9 illustrates, for one embodiment, an example system 900 having one or more processor(s) 905, system control module 910 coupled to at least one of the processor(s) 905, system memory 915 coupled to system control module 910, non-volatile memory (NVM)/storage 920 coupled to system control module 910, and one or more communications interface(s) 925 coupled to system control module 910.

In some embodiments, the system 900 may be capable of functioning as the UE 110 as described herein. In other embodiments, the system 900 may be capable of functioning as the eNB 95 depicted in the embodiment shown in FIG. 1 or any one of the other described embodiments. In some embodiments, the system 900 may include one or more computer-readable media (e.g., system memory or NVM/storage 920) having instructions and one or more processors (e.g., processor(s) 905) coupled with the one or more computer readable media and configured to execute the instructions to implement a module to perform actions described herein. System control module 910 for one embodiment may include any suitable interface controllers to provide for any suitable interface to at least one of the processor(s) 905 and/or to any suitable device or component in communication with system control module 910. Processor(s) 905 may be arranged to implement an on duration timer 940, an inactivity timer 942, a retransmission timer 944, a long DRX cycle timer 946 and a short DRX cycle timer 948.

System control module 910 may include memory controller module 930 to provide an interface to system memory 915. The memory controller module 930 may be a hardware module, a software module, and/or a firmware module.

System memory 915 may be used to load and store data and/or instructions, for example, for system 900. System memory 915 for one embodiment may include any suitable volatile memory, such as suitable DRAM, for example. In some embodiments, the system memory 915 may include double data rate type four synchronous dynamic random-access memory (DDR4 SDRAM). System control module 910 for one embodiment may include one or more input/output (I/O) controller(s) to provide an interface to NVM/storage 920 and communications interface(s) 925.

The NVM/storage 920 may be used to store data and/or instructions, for example. NVM/storage 920 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example. The NVM/storage 920 may include a storage resource physically part of a device on which the system 900 is installed or it may be accessible by, but not necessarily a part of, the device. For example, the NVM/storage 920 may be accessed over a network via the communications interface(s) 925.

Communications interface(s) 925 may provide an interface for system 900 to communicate over one or more network(s) and/or with any other suitable device. The system 900 may wirelessly communicate with the one or more components of the wireless network in accordance with any of one or more wireless network standards and/or protocols.

For one embodiment, at least one of the processor(s) 905 may be packaged together with logic for one or more controller(s) of system control module 910, e.g., memory controller module 930. For one embodiment, at least one of the processor(s) 905 may be packaged together with logic for one or more controllers of system control module 910 to form a System in Package (SiP). For one embodiment, at least one of the processor(s) 905 may be integrated on the same die with logic for one or more controller(s) of system control module 910. For one embodiment, at least one of the processor(s) 905 may be integrated on the same die with logic for one or more controller(s) of system control module 910 to form a System on Chip (SoC).

In various embodiments, the system 900 may be, but is not limited to, a server, a workstation, a desktop computing device, or a mobile computing device (e.g., a laptop computing device, a handheld computing device, a tablet, a netbook, etc.). In various embodiments, the system 900 may have more or less components, and/or different architectures. For example, in some embodiments, the system 900 includes one or more of a camera, a keyboard, liquid crystal display (LCD) screen (including touch screen displays), non-volatile memory port, multiple antennas, graphics chip, application-specific integrated circuit (ASIC), and speakers.

Figure 10:
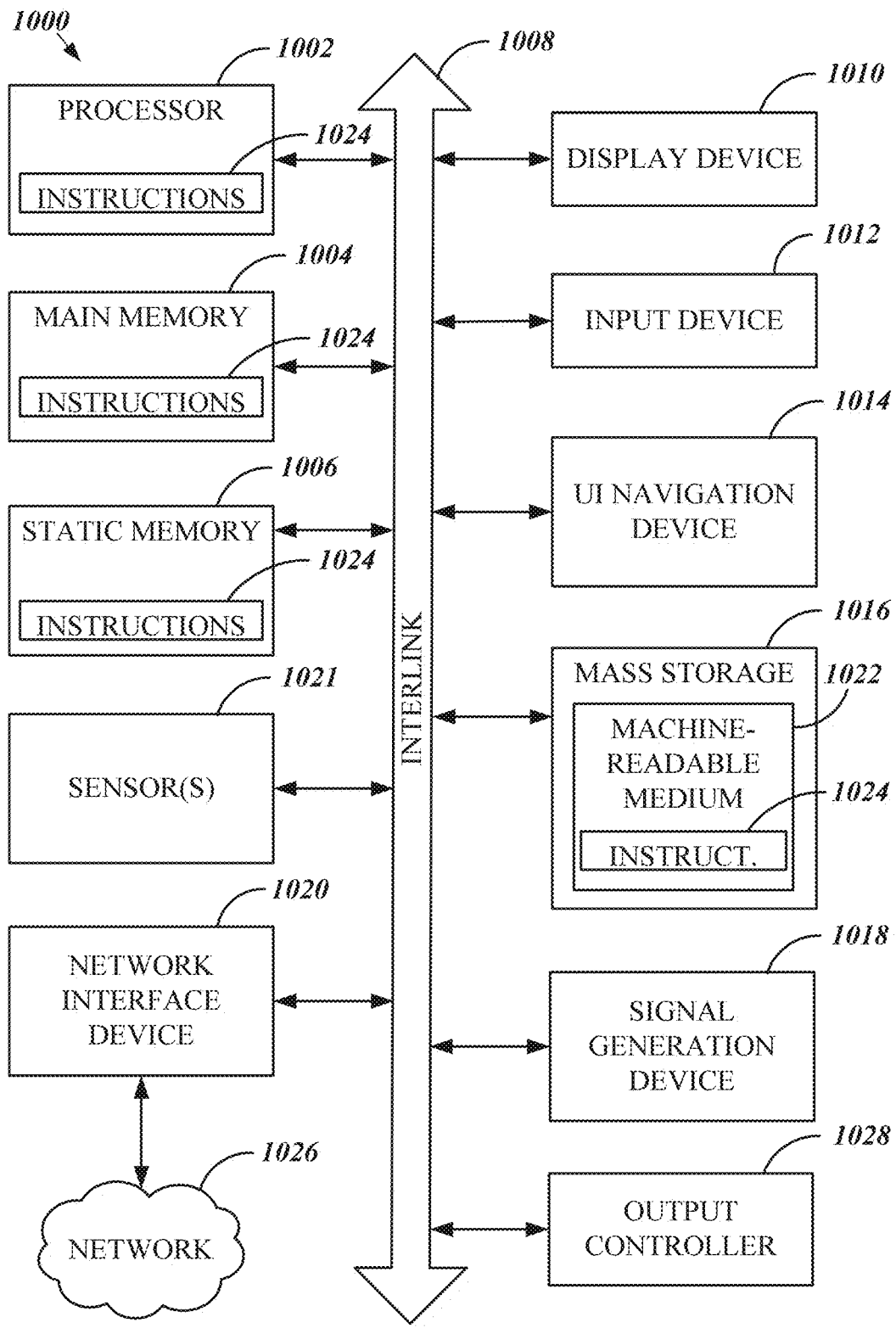
FIG. 10 illustrates a block diagram of an example machine for providing DRX enhancements in LTE systems according to an embodiment.

FIG. 10 illustrates a block diagram of an example machine 1000 for providing DRX enhancements in LTE systems according to an embodiment upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine and/or a client machine in server-client network environments. In an example, the machine 1000 may act as a peer machine in peer-to-peer (P2P) (or other distributed) network environment. The machine 1000 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1002 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 1002 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, at least some of which may communicate with others via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR)) connection to communicate or control one or more peripheral devices (e.g., a printer, card reader, etc.).

The storage device 1016 may include at least one machine readable medium 1022 on which is stored one or more sets of data structures or instructions 1024 (e.g., software) embodying or utilized by any one or more of the techniques or functions described herein. The instructions 1024 may also reside, at least partially, additional machine readable memories such as main memory 1004, static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) that configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1×* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (Wifi), IEEE 802.16 standards (WiMax®) and others), peer-to-peer (P2P) networks, or other protocols now known or later developed.

For example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

FIG. 11 illustrates example of PUCCH resource collision 1100 due to legacy PDCCH and ePDCCH. As shown in FIG. 11, the CCE or eCCE indices 1110 are shown. Indices # m+2 1120 and # m+3 1122 are associated with PDCCH with aggregation level 2 for UE #0 1130. However, indices # m+2 1120 and # m+3 1122 are also associated with PDCCH with aggregation level 2 for UE #1 1140. Two UEs, e.g., UE #0 1130 and UE #1 1140 thus have the same lowest CCE (eCCE) index, which results in the use of the same PUCCH resources. This problem can be solved by introducing offset value in inducing PUCCH resources. If the offset value is denoted as $n_{offset}$, then PUCCH resource for HARQ-ACK due to ePDCCH can be determined:

For FDD:

$n_{PUCCH}^{(1,\tilde{p}0)}=n_{eCCE}+N_{PUCCH}^{(1)}+n_{offset}$ for antenna port 0, $n_{PUCCH}^{(1,\tilde{p}1)}=n_{eCCE}+N_{PUCCH}^{(1)}+n_{offset}$ for antenna port 1.

For TDD:

$n_{PUCCH}^{(1,\tilde{p}0)}=(M-m-1)\cdot N_c+m\cdot N_{c+1}+n_{CCE}+N_{PUCCH}^{(1)}+n_{offset}$ for antenna port 0, $n_{PUCCH}^{(1,\tilde{p}1)}=(M-m-1)\cdot N_c+m\cdot N_{c+1}+n_{CCE}+N_{PUCCH}^{(1)}+n_{offset}$ for antenna port 1.

The offset value $n_{offset}$ can be given via DCI. It can be x-bits and naturally more x-bits can provide more degree of freedom to avoid the collisions. Alternatively, the offset value $n_{offset}$ can be an antenna specific offset associated with antenna port p, where p is the antenna port allocated to the first CCE of corresponding ePDCCH. For distributed ePDCCH, $k_p=0$, p=107, 109 and for localized ePDCCH, $k_p$=p−107, p∈{107, 108, 109, 110}. In this case, it can be $n_{offset}=2\cdot m\cdot k_p$ (where m is integer). If m=1, $n_{offset}=2\cdot k_p$. Another expression with antenna specific offset is as follows:

For FDD:

$n_{PUCCH}^{(1,\tilde{p}0)}=n_{eCCE}+N_{PUCCH}^{(1)}+k_p$ for antenna port 0, $n_{PUCCH}^{(1,\tilde{p}1)}=n_{eCCE}+N_{PUCCH}^{(1)}+k_p$ for antenna port 1.

For TDD:

$n_{PUCCH}^{(1,\tilde{p}0)}=(M-m-1)\cdot N_c+m\cdot N_{c+1}+n_{CCE}+N_{PUCCH}^{(1)}+k_p$ for antenna port 0, $n_{PUCCH}^{(1,\tilde{p}1)}=(M-m-1)\cdot N_c+m\cdot N_{c+1}+n_{CCE}+N_{PUCCH}^{(1)}+k_p$ for antenna port 1.

where $k_p$ can be an antenna specific offset associated with antenna port p, where p is the antenna port allocated to the first CCE of corresponding ePDCCH.

For distributed ePDCCH, $k_p$=0, p=107,109 and for localized ePDCCH, $k_p$=2·(p−107), p∈{107,108,109,110}.

Accordingly, a lowest control channel element index ($n_{CCE}$), a lowest enhanced control channel element index ($n_{eCCE}$), a user equipment specific starting offset ($N_{PUCCH}^{(1)}$) and at least one additional offset-related parameter may be received on an enhanced physical downlink control channel (ePDCCH). An allocation of an uplink resource of a physical uplink control channel (PUCCH) for Hybrid Automatic Repeat reQuest-ACKnowledgement (HARQ-ACK) transmission may be determined based on the lowest control channel element index ($n_{CCE}$), the lowest enhanced control channel element index ($n_{eCCE}$), the user equipment specific starting offset ($N_{PUCCH}^{(1)}$) and at least one additional offset-related parameter. The additional offset-related parameter may include an acknowledgement/non-acknowledgement (ACK/NACK) resource offset (ARO) value, an antenna port offset (AP), a maximum number of eCCE indices among ePDCCH sets to a user equipment in a specified subframe ($N_m$), an offset informed to the user equipment by higher layer signaling to avoid collision with the user equipment in coordinating cells ($N_{PUCCH,CoMP}^{(1)}$), and/or a value associated with one or more of a specific subframe, a signaled value, a physical downlink shared channel, and a semi-persistent scheduling (SPS).

Additional Notes & In Examples:

In Example 1 includes subject matter (such as a device, apparatus, client or system) for a serving node, including a system control module for controlling communications via a communications interface and a processor, coupled to the system control module, the processor arranged to implement an inactivity timer and an on-duration tinier for determining an active time for monitoring subframes on the physical downlink control channel for control signals, the processor further monitoring subframes after the active time.

In Example 2 the subject matter of Example 1 may optionally include, wherein the processor detects and initiates decoding of a control signal received on the PDCCH during a time period associated with the subframe providing the control signal, the processor determining whether the decoding of the control signal has been completed at the end of the subframe and continuing to monitor subsequent frames after the active time.

In Example 3 the subject matter of any one or more of Examples 1-2 may optionally include, wherein the processor continues to monitor subsequent frames after the active time to determine whether a link grant is received in the subsequent frame while decoding the control signal.

In Example 4 the subject matter of any one or more of Examples 1-3 may optionally include, wherein the processor initiates the inactivity timer after decoding the control signal.

In Example 5 the subject matter of any one or more of Examples 1-4 may optionally include, wherein the control signal is received in a subframe during a continuous reception mode.

In Example 6 the subject matter of any one or more of Examples 1-5 may optionally include, wherein the control signal is received in a subframe during an on-duration period of a short discontinuous reception cycle.

In Example 7 the subject matter of any one or more of Examples 1-6 may optionally include, wherein the control signal is received in a subframe during an on-duration period of a long discontinuous reception cycle.

In Example 8 the subject matter of any one or more of Examples 1-7 may optionally include, wherein the processor is further arranged to implement an inactivity timer and an on-duration timer for determining an active time for monitoring subframes on the physical downlink control channel for resource allocations, the processor further arranged to implement a continuous reception mode, a short discontinuous reception cycle and a long discontinuous reception cycle, wherein the long discontinuous reception cycle is set to seventy milliseconds to allow monitoring during a HARQ timing period.

In Example 9 includes subject matter (such as a device, apparatus, client or system) for a serving node, including a system control module for controlling communications via a communications interface and a processor, coupled to the system control module, the processor arranged to implement an inactivity timer and an on-duration timer for determining an active time for monitoring subframes on the physical downlink control channel for resource allocations, the processor further arranged to implement a continuous reception mode, a short discontinuous reception cycle and a long discontinuous reception cycle, wherein the long discontinuous reception cycle is set to seventy milliseconds to allow monitoring during a HARQ timing period.

In Example 10 the subject matter of Example 9 may optionally include, wherein the processor is further arranged to implement an inactivity timer and an on-duration timer for determining an active time for monitoring subframes on the physical downlink control channel for resource allocations, the processor further monitoring subframes after the active time.

In Example 11 the subject matter of any one or more of Examples 9-10 may optionally include, wherein the processor detects and initiates decoding of a control signal received on the PDCCH during a time period associated with the subframe providing the control signal, the processor determining whether the decoding of the control signal has been completed at the end of the subframe and continuing to monitor subsequent frames after the active time.

In Example 12 the subject matter of any one or more of Examples 9-11 may optionally include, wherein the processor continues to monitor subsequent frames after the active time to determine whether a link grant is received in the subsequent frame while decoding the control signal.

In Example 13 the subject matter of any one or more of Examples 9-12 may optionally include, wherein the processor initiates the inactivity timer after decoding the control signal.

In Example 14 the subject matter of any one or more of Examples 9-13 may optionally include, wherein the control signal is received in a subframe during a continuous reception mode.

In Example 15 the subject matter of any one or more of Examples 9-14 may optionally include, wherein the control signal is received in a subframe during an on-duration period of a short discontinuous reception cycle.

In Example 16 the subject matter of any one or more of Examples 9-15 may optionally include, wherein the control signal is received in a subframe during an on-duration period of a long discontinuous reception cycle.

In Example 17 may include subject matter (such as a method or means for performing acts) including, implementing an inactivity timer and an on-duration timer for determining an active time for monitoring subframes on the physical downlink control channel for control signals, receiving a control signal in a subframe received on the physical downlink control channel, initiating decoding of the control signal during a time period associated with the subframe, determining whether the decoding of the control signal has been completed at the end of the subframe and continuing to monitor subsequent subframes for control signals received on the physical downlink control channel after the active time.

In Example 18 the subject matter of Example 17 may optionally include further comprises determining whether the decoding of the control signal has been completed at the end of the subframe and continuing to monitor subsequent frames after the active time.

In Example 19 the subject matter of any one or more of Examples 17-18 may optionally include, wherein the continuing to monitor subsequent subframes for control signals received on the physical downlink control channel after the active time comprises determining whether a link grant is received in the subsequent frame while decoding the control signal.

In Example 20 the subject matter of any one or more of Examples 17-19 may optionally include, wherein the receiving the control signal in the subframe received on the physical downlink control channel further comprises receiving the control signal in a subframe during a continuous reception mode.

In Example 21 the subject matter of any one or more of Examples 17-20 may optionally include, further comprising implementing a continuous reception mode, a short discontinuous reception cycle and a long discontinuous reception cycle and setting a start offset of the long discontinuous reception cycle to seventy milliseconds to allow monitoring during a HARQ timing period.

In Example 22 the subject matter of any one or more of Examples 17-21 may optionally include, determining an active time for monitoring subframes on the physical downlink control channel for resource allocations based on an inactivity timer and on-duration timer, implementing a continuous reception mode, a short discontinuous reception cycle and a long discontinuous reception cycle, and setting a start offset of the long discontinuous reception cycle to seventy milliseconds to allow monitoring during a HARQ timing period.

In Example 23 the subject matter of any one or more of Examples 17-22 may optionally include, further comprising monitoring subframes after the active time.

In Example 24 the subject matter of any one or more of Examples 17-23 may optionally include, further comprising detecting a control signal received on the PDCCH during a time period associated with the subframe providing the control signal, decoding the control signal, determining whether the decoding of the control signal has been completed at the end of the subframe and continuing to monitor subsequent frames after the active time.

Example 2.5 may include subject matter (such as means for performing acts or machine readable medium including instructions that, when executed by the machine, cause the machine to perform acts) including implementing an inactivity timer and an on-duration timer for determining an active time for monitoring subframes on the physical downlink control channel for control signals, receiving a control signal in a subframe received on the physical downlink control channel, initiating decoding of the control signal during a time period associated with the subframe, determining whether the decoding of the control signal has been completed at the end of the subframe and continuing to monitor subsequent subframes for control signals received on the physical downlink control channel after the active time.

In Example 26 the subject matter of Example 25 may optionally include determining whether the decoding of the control signal has been completed at the end of the subframe and continuing to monitor subsequent frames after the active time.

In Example 27 the subject matter of any one or more of Examples 25-26 may optionally include, wherein the continuing to monitor subsequent subframes for control signals received on the physical downlink control channel after the active time comprises determining whether a link grant is received in the subsequent frame while decoding the control signal.

In Example 28 the subject matter of any one or more of Examples 25-27 may optionally include, wherein the receiving the control signal in the subframe received on the physical downlink control channel further comprises receiving the control signal in a subframe during a continuous reception mode.

In Example 29 the subject matter of any one or more of Examples 25-28 may optionally include, implementing a continuous reception mode, a short discontinuous reception cycle and a long discontinuous reception cycle and setting a start offset of the long discontinuous reception cycle to seventy milliseconds to allow monitoring during a HARQ timing period.

Example 30 may include subject matter (such as means for performing acts or machine readable medium including instructions that, when executed by the machine, cause the machine to perform acts) including determining an active time for monitoring subframes on the physical downlink control channel for resource allocations based on an inactivity timer and on-duration timer, implementing a continuous reception mode, a short discontinuous reception cycle and a long discontinuous reception cycle and setting a start offset of the long discontinuous reception cycle to seventy milliseconds to allow monitoring during a HARQ timing period.

In Example 31 the subject matter of Example 30 may optionally include, monitoring subframes after the active time.

In Example 32 the subject matter of any one or more of Examples 30-31 may optionally include, detecting a control signal received on the PDCCH during a time period associated with the subframe providing the control signal, decoding the control signal, determining whether the decoding of the control signal has been completed at the end of the subframe and continuing to monitor subsequent frames after the active time.

The above detailed description includes references to the accompanying drawings, which form a part of the detailed description. The drawings show, by way of illustration, specific embodiments that may be practiced. These embodiments are also referred to herein as "examples," Such examples may include elements in addition to those shown or described. However, also contemplated are examples that include the elements shown or described, Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their Objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a user equipment (UE), the apparatus comprising:
processing circuitry in communication with a memory and arranged to:
decode, from an evolved NodeB (eNB), a Radio Resource Control (RRC) message dependent on a RRC mode of the apparatus, the RRC message comprising a RadioResourceConfigDedicated information element (IE), the RadioResourceConfigDedicated IE comprising a MAC-MainConfig IE, the MAC-MainConfig IE comprising a discontinuous reception (DRX) configuration IE, the DRX configuration IE comprising:
a plurality of timers that indicate: timing for the UE to monitor for a physical downlink control channel (PDCCH), timing before the UE enters an idle state, and timing for downlink retransmission, and
a long DRX cycle start offset that provides a timing to enable transmission of a Hybrid Automatic Repeat Request (HARD) for a Time Division Duplexing (TDD) configuration 0; and
monitor, based on the timers in the DRX configuration IE, PDCCHs for a control signal that indicates transmission of user data for the UE, wherein the memory is configured to store the plurality of timers and the long DRX cycle start offset.

2. The apparatus of claim 1, wherein:
the timers comprise an on-duration timer, an inactivity timer, a retransmission timer, and a DRX short cycle timer, and
the processing circuitry is further arranged to stop at least one of the timers in response to reception by the apparatus of a DRX Command Medium Access Control (MAC) control element.

3. The apparatus of claim 2, wherein the processing circuitry is further arranged to:
in response to expiration of the inactivity timer or reception of the DRX Command MAC control element, start or restart the DRX short cycle timer and use a short DRX cycle.

4. The apparatus of claim 2, wherein:
reception of the DRX Command MAC control element stops the on-duration timer and inactivity timer.

5. The apparatus of claim 1, wherein the processing circuitry is further arranged to:
use the long DRX cycle after expiration of a DRX short cycle timer.

6. The apparatus of claim 1, wherein the long DRX cycle start offset is 70 ms.

7. The apparatus of claim 1, wherein the processing circuitry is further arranged to:
detect the control signal during a particular subframe in which the PDCCH is monitored,
decode the control signal,
determine whether the control signal has been decoded at an end of the particular subframe,
while the control signal is being decoded, continue to monitor at least one subframe to determine whether a user data transmission for the UE is received, and
initiate an inactivity timer of the plurality of timers after the control signal has been decoded.

8. The apparatus of claim 7, wherein the control signal is received during one of: a continuous reception mode, an on-duration period of a short DRX cycle, or an on-duration period of the long DRX cycle.

9. The apparatus of claim 1, wherein the processing circuitry is further arranged to:
restart an inactivity timer of the plurality of timers following successful decoding of a PDCCH for a first transmission of data and not for a retransmission of the data.

10. The apparatus of claim 1, wherein:
the PDCCH is an enhanced PDCCH (ePDCCH), and
the ePDCCH is monitored by the processing circuitry after an active time for a number the subframes determined based on an ePDCCH processing time of the processing circuitry.

11. An apparatus of an evolved NodeB (eNB), the apparatus comprising:
a memory; and
processing circuitry in communication with the memory and arranged to:
generate, for transmission to a user equipment (UE), a Radio Resource Control (RRC) Connection Setup message when the UE is in RRC Idle Mode or a RRC Connection Reconfiguration message when the UE is in RRC Connected Mode, the RRC Connection Setup or Reconfiguration message comprising a RadioResourceConfigDedicated information element (IE), the RadioResourceConfigDedicated IE comprising:
a MAC-MainConfig IE, the MAC-MainConfig IE comprising a discontinuous reception (DRX) configuration IE, the DRX configuration IE comprising a plurality of timers that indicate timing for the UE to monitor for a physical downlink control channel (PDCCH), timing before the UE enters an idle state, and timing for downlink retransmission, a long DRX cycle start offset that provides a timing to enable transmission of a Hybrid Automatic Repeat Request (HARD) for a Time Division Duplexing (TDD) configuration 0, and a short DRX cycle timer that specifies a number of consecutive subframes that the UE is to follow a short DRX cycle; and
generate, for transmission to the UE based on the DRX configuration IE, a control signal that indicates data for the UE, the control signal in a PDCCH of the short DRX cycle or a subsequent long DRX cycle.

12. The apparatus of claim 11, wherein the control signal is in one of subframes of an active time and subframes after the active time in at least one of an on duration of the short DRX cycle and an on duration of the long DRX cycle, the active time comprising a time while one of the timers is operating.

13. The apparatus of claim 11, wherein the DRX configuration IE indicates to restart an inactivity timer of the plurality of timers following successful decoding of a PDCCH for a first transmission of data and not for a retransmission of the data.

14. The apparatus of claim 11, wherein:
the PDCCH is an enhanced PDCCH (ePDCCH), and
the control signal is generated after an active time for a number of subframes determined based on an ePDCCH processing time of the UE.

15. A non-transitory computer-readable storage medium that stores instructions for execution by one or more processors of a user equipment (UE) to communicate with an evolved NodeB (eNB), the one or more processors to configure the UE to:
receive, from an evolved NodeB (eNB), a Radio Resource Control (RRC) message dependent on a RRC mode of the UE, the RRC message comprising a RadioResourceConfigDedicated information element (IE), the RadioResourceConfigDedicated IE comprising a MAC-MainConfig IE, the MAC-MainConfig IE comprising a discontinuous reception (DRX) configuration IE, the DRX configuration IE comprising:
a plurality of timers that indicate: timing for the UE to monitor for a physical downlink control channel (PDCCH), timing before the UE enters an idle state, and timing for downlink retransmission, and
a long DRX cycle start offset that provides a timing to enable transmission of a Hybrid Automatic Repeat Request (HARD) for a Time Division Duplexing (TDD) configuration 0; and
monitor, based on the timers in the DRX configuration IE, PDCCHs for a control signal that indicates transmission of user data for the UE.

16. The non-transitory computer-readable storage medium according to claim 15, wherein the instructions further configure the one or more processors to:
detect the control signal during a particular subframe in which the PDCCH is monitored, receive the control signal,
determine whether the control signal has been decoded at an end of the particular subframe,
while the control signal is being decoded, continue to monitor at least one subframe to determine whether a user data transmission for the UE is received, and
initiate an inactivity timer of the plurality of timers after the control signal has been decoded.

17. The non-transitory computer-readable storage medium according to claim 16, wherein the instructions further configure the one or more processors to initiate the inactivity timer after the control signal has been decoded.

18. The non-transitory computer-readable storage medium according to claim 15, wherein the control signal is received during one of: a continuous reception mode, an on-duration period of a short DRX cycle, or an on-duration period of a long DRX cycle.

19. The non-transitory computer-readable storage medium according to claim 15, wherein the instructions further configure the one or more processors to restart an inactivity timer of the plurality of timers following successful decoding of a PDCCH for a first transmission of data and not for a retransmission of the data.

20. The non-transitory computer-readable storage medium according to claim 15, wherein:
the PDCCH is an enhanced PDCCH (ePDCCH), and
the instructions further configure the one or more processors to monitor the ePDCCH after an active time for a number of subframes determined based on an ePDCCH processing time of the UE.

* * * * *